United States Patent
Negoita et al.

(10) Patent No.: US 11,921,163 B2
(45) Date of Patent: Mar. 5, 2024

(54) MODULAR MACHINE LEARNING STRUCTURE FOR ELECTRIC VEHICLE BATTERY STATE OF HEALTH ESTIMATION

(71) Applicant: VOLKSWAGEN AKTIENGESELLSCHAFT, Wolfsburg (DE)

(72) Inventors: Gianina Alina Negoita, Belmont, CA (US); Wesley Teskey, Foster City, CA (US); Jean-Baptiste Renn, San Francisco, CA (US); William Arthur Paxton, Redwood City, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/553,585

(22) Filed: Dec. 16, 2021

(65) Prior Publication Data

US 2023/0194614 A1 Jun. 22, 2023

(51) Int. Cl.
*G01R 31/367* (2019.01)
*B60L 58/12* (2019.01)
(Continued)

(52) U.S. Cl.
CPC ............ *G01R 31/367* (2019.01); *B60L 58/12* (2019.02); *G01R 31/382* (2019.01);
(Continued)

(58) Field of Classification Search
CPC .. G01R 31/367; G01R 31/382; G01R 31/392; G01R 31/396; B60L 58/12; G06N 3/02; G06N 3/04; G06N 3/045; G06F 2218/08
See application file for complete search history.

(56) References Cited

U.S. PATENT DOCUMENTS 10,422,837 B2   9/2019 Park et al.
2020/0081070 A1* 3/2020 Chemali ............... H02J 7/0048
(Continued)

FOREIGN PATENT DOCUMENTS

CN    111856287 A  * 10/2020  .......... G01R 31/367

OTHER PUBLICATIONS

Sanchez-Lengeling et al., "A Gentle Introduction to Graph Neural Networks" Distill, Sep. 2, 2021, available at https://distill.pub/2021/gnn-intro/ (Year: 2021).*

*Primary Examiner* — John C Kuan
(74) *Attorney, Agent, or Firm* — Shield Intellectual Property PC; Zhichong Gu

(57) ABSTRACT

Approaches, techniques, and mechanisms are disclosed for assessing battery states of batteries. According to one embodiment, raw sensor data are collected from a battery module. The battery module includes multiple battery cells. Input battery features are extracted from the raw sensor data collected from the battery module. The input battery features are used to update node states of a GNN. The GNN include multiple GNN nodes each of which representing a respective battery cell in the multiple battery cells. Estimation of one or more battery state of health (SoH) indicators is generated based at least in part on individual output states of individual GNN nodes in the multiple GNN nodes. The individual output states of individual GNN nodes in the multiple GNN nodes are determined based at least in part on the updated node states of the GNN.

21 Claims, 12 Drawing Sheets

(51) Int. Cl.
*G01R 31/382* (2019.01)
*G01R 31/392* (2019.01)
*G01R 31/396* (2019.01)
*G06N 3/02* (2006.01)
*G06N 3/04* (2023.01)
*G06N 3/045* (2023.01)

(52) U.S. Cl.
CPC ......... *G01R 31/392* (2019.01); *G01R 31/396* (2019.01); *G06N 3/02* (2013.01); *G06N 3/04* (2013.01); *G06N 3/045* (2023.01); *G06F 2218/08* (2023.01)

(56) References Cited

U.S. PATENT DOCUMENTS

2022/0065939 A1\* 3/2022 Senn ................. G06N 3/088
2022/0373600 A1\* 11/2022 Leonard ............. G01R 31/3835

\* cited by examiner

400

```
collect raw sensor data from a battery module
operating by a vehicle 402
            │
extract input battery features from the raw sensor
data 404
            │
use the input battery features to update node
states of a GNN 406
            │
generate estimation of battery SoH indicators
408
```

*FIG. 4*

MODULAR MACHINE LEARNING STRUCTURE FOR ELECTRIC VEHICLE BATTERY STATE OF HEALTH ESTIMATION

TECHNICAL FIELD

Embodiments relate generally to electric batteries, and, more specifically, to modular machine learning structure for electric vehicle battery state of health estimation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Under some approaches, battery health and lifetime can be estimated based on domain-knowledge driven physical models, which incorporate pre-identified dominating mechanisms such as thermal, electrochemical and aging effects in estimation of battery life and aging. Under these approaches, cell-level knowledge is generated from detailed battery cell models and estimation/control algorithms for a single cell in a relatively uniform or isolated environment. The knowledge of the single cell may be applied or extrapolated into pack-level estimation or determination of battery health and lifetime for a relatively large-scale battery pack composed of numerous interconnected cells based on an assumption of 'modularity'. The term 'modularity' is defined as the ability to extrapolate (e.g., thermal, aging, etc.) behaviors of a battery pack composed of numerous cells from corresponding behaviors of a single cell.

In reality, battery cells are connected in series and/or parallel to form a battery pack. Variations exist among the cells in the battery pack due to manufacturing variances and in-homogeneous operating conditions. These variations become even larger as the cells age. Various studies have indicated that the modularity assumption does not hold true. A large-scale battery pack frequently can age faster than a single cell in the pack. Thermal behaviors of the battery pack can be less uniform and more pronounced in comparison with a single cell. The modularity assumption can be further violated due to cell-to-cell variations caused by manufacturing variances.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates an example process flow; and

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Structural Overview
    2.1. Time Series Forecasting
    2.2. Graph neural networks
    2.3. Battery Cells as GNN Nodes
    2.4. Battery Module As GNN Nodes
    3.0. Functional Overview
    3.1. Feature Extraction
    3.2. Relational Modeling
    3.3. Task Specific Module
    3.4. Example Use Cases
    4.0. Example Process Flows
    5.0. Implementation Mechanism—Hardware Overview
    6.0. Extensions and Alternatives

1.0. General Overview

Techniques as described herein can be applied to or implemented with lithium-ion batteries and other types of batteries used in electric vehicles. Additionally, optionally or alternatively, some or all techniques as described herein may be applicable to non-vehicle systems.

Figure 1A:
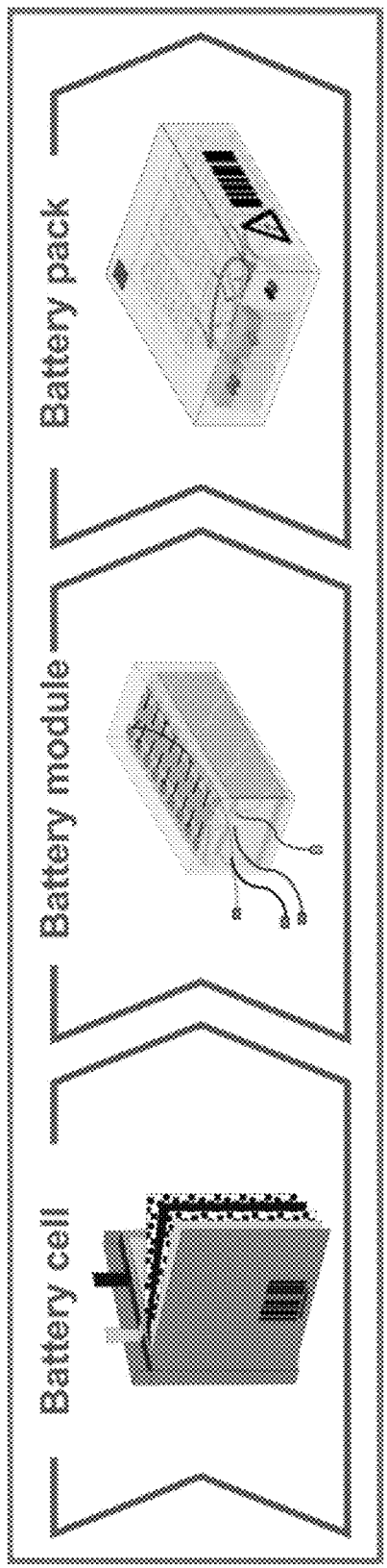
FIG. 1A and FIG. 1B illustrate example battery cells and battery modules in a battery pack and example electric connections among battery cells and modules.
Figure 1B:
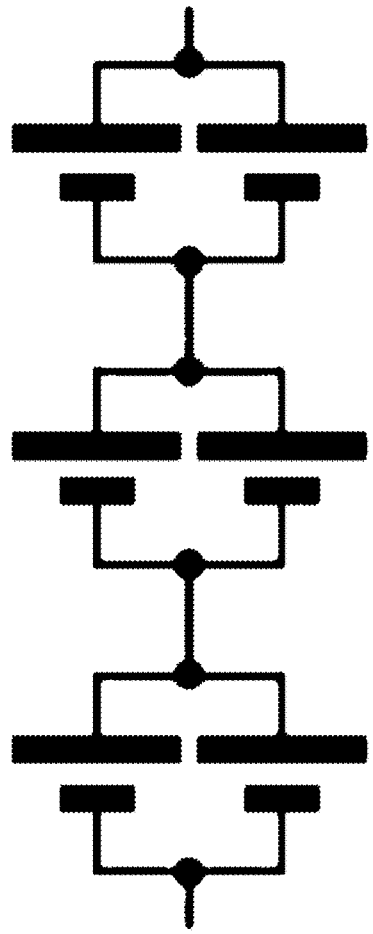

In general, batteries deployed with electric vehicles or other types of systems can be complex systems themselves in which battery cells may be electrically connected in series and/or parallel to form battery modules and battery packs, as illustrated in FIG. 1A and FIG. 1B. A battery pack may be formed by one or more battery modules electrically connected in series and/or parallel. Each module in the one or more battery modules of the battery pack may be formed by one or more battery cells electrically connected in series and/or parallel.

Battery performance degrades with time and usage as a result of aging processes occurring in the battery. Understanding, predicting, and slowing the aging behavior or process of a battery pack is a very complicated problem. In the case of a large-scale battery pack composed of numerous cells, non-uniform temperature distribution across the pack can easily occur as the cells of the battery pack are subjected to high electric current flows during fast charging. This non-uniform temperature distribution can be exacerbated by intrinsic cell-level heterogeneities introduced in manufacturing, as not all cells are created equal or identical in manufacturing processes. The non-uniformity in temperature in the pack may create local hot spots and thermal gradients that can affect adjacent cells and spread throughout the pack. The thermal gradients due to temperature differences or non-uniformity in different spatial regions of the pack can cause local and non-uniform aging, performance degradation, and aging gradients in the different spatial regions or cells within the pack, ultimately contributing towards accelerated pack aging or even thermal runaway in the pack. For example, effects and results of thermal and aging behaviors such as formation of resistive surface films at the electrolyte/electrode interface, loss of active electrolyte and/or electrode materials, loss of active lithium ions, contact losses in the electrodes, etc., may cause the battery pack to have a relatively low capacity of electric charge or energy and to perform poorly in electric vehicle driving range and vehicle acceleration.

Capacity and internal resistance are two (electric) battery properties that can be used to represent or capture characteristics of battery performance. Capacity of a battery (e.g., a battery cell, module or pack, etc.) represents a measure for the total electric charge that a battery can store—e.g., after a charging cycle—at a given time point of lifetime of the battery. Internal resistance is a measure for the opposition to a current flow in the battery and is correlated with the maximum acceleration a vehicle can experience with the battery. The aging process of the battery leads to a decrease in capacity and an increase in internal resistance.

To assess the battery health, the current performance of a battery can be represented by current values of one or more state variables (e.g., charge, internal resistance, etc.) of the battery. The current values of state variable can be compared with initial values (referred to as BoL values) of the same state variable representing the beginning-of-life (BoL) performance of the battery to determine the current performance of the battery. The BoL values of the battery can be determined or derived from battery performance or capacity measurements made in a battery manufacturing process. The BoL performance of the battery as represented by the BoL values may be deemed or defined as 100% SoH, which decreases to a percentage less than 100% as the battery performance degrades over time. In some operational scenarios, the battery may be regarded as having reached its end of life for vehicle applications or automotive operations when a current value of any one of the state variables of the battery has gone below 80% SoH. The battery may be repurposed for a second use phase such as non-vehicle applications with lower performance requirements.

The operational conditions of the battery have a significant impact on battery performance. For example, lithium-ion batteries perform badly at low (e.g., ambient, etc.) temperatures due to an increase of internal resistance in the low temperatures. As a result, the driving range and vehicle acceleration may drop dramatically. On the other hand, low temperatures may be better for storing or maintaining electric charges in the battery as self-discharge is less and calendric aging is slower in the low temperatures. In comparison, temperatures above a certain (e.g., normal, optimal, comfortable, etc.) temperature range of a battery can result in much more efficient discharge in a discharge cycle, but aging and self-discharge are also faster, which can significantly shorten the battery's lifetime. In addition, charge/discharge cycles can also have a major impact on the aging of a battery as well as on the state-of-charge (SoC) level of the battery.

Vehicle electrification is desired in order to reduce $CO_2$ emissions contributing to a better air quality and mitigating effects of climate change. By using electric vehicles in combination with renewable energy generation, e.g., solar, wind, or hydro power, an overall emission reduction or even the complete elimination of emissions can be achieved. In order to expand the use of electric vehicles, an increase in driving range and battery lifetime is desired. For example, a lifetime of at least 10 years for a battery pack would be desirable, and so would the ability of the battery pack to support fast charging to 80% of its capacity in 15 minutes or less.

However, there are some issues and challenges with the use of electric vehicles regarding driving range, safety, fast charging capabilities and battery lifetime. Some of these issues can be solved or ameliorated with (e.g., in-vehicle, out-of-vehicle, cloud-based, cloud-assisted, etc.) reliable state-of-health (SoH) and/or state-of-charge (SoC) estimations for a battery pack deployed onboard an electric vehicle. The reliable SoH and/or SoC estimations may be used to manage the battery pack in vehicle operations to ensure safety, to optimize performance and reliability, and to enable relatively efficient use of the battery pack. As a result, the size of the battery pack may be reduced than otherwise to result in a reduction of an overall weight and cost of the vehicle. The lifetime of the battery pack may also be effectively extended by adjusting operating conditions in response to the reliable SoH and/or SoC estimations generated contemporaneously with operations of the vehicle.

The techniques as described herein can be implemented by a battery management system deployed in or onboard an automotive electric vehicle, by a separate out-of-vehicle or cloud-based system operating in conjunction with an in-vehicle system, by a non-vehicle-based system, etc. These techniques can be used to estimate battery health and lifetime such as SoH and SoC of a battery pack in the vehicle relatively reliably and accurately with no or little reliance on modularity assumption (which assumes the health of a cell can be simply scaled to the health of a batter pack composed of numerous cells/modules).

As used herein, the term "SoH" may refer to a scalar indicating a specific type of battery performance characteristic (e.g., power, energy, charge capacity, internal resistance, maximal achievable voltage, maximum achievable current, etc.) or an overall battery performance measure as a weighted or unweighted sum of several types of battery performance characteristics. Additionally, optionally or alternatively, the term "SoH" may refer to a plurality of scalars each of which indicates a respective specific type of battery performance characteristic among multiple types of battery performance characteristics. In operational scenarios in which battery performance characteristics of multiple types are generated in SoHs, these battery performance characteristics of the multiple types can be generated by the same system concurrently, serially, or currently in part and serial in part, as driven by some or all of the same raw sensor data. Example performance characteristic(s) as indicated by SoH(s) as described herein may, but are not necessarily limited to only, SoC or charge capacity at cell, module and/or pack levels.

Under these techniques, data-driven SoH and/or SoC estimation models can be defined, created, generated and/or implemented to assess and monitor internal states and parameters of individual cells in the batter pack or each battery module therein and to learn and capture cell-to-cell interactions or relations among battery cells within the battery pack or each battery module therein. Realtime or near realtime raw battery sensor data, such as acquired with physical battery sensors deployed at cell, module and/or pack levels of the battery pack, can be used or received as input to drive the SoH and/or SoC estimation models to obtain relatively accurate and timely (e.g., within a specific time budget, etc.) information about, and monitor, health and performance of the battery pack at the cell, module and/or pack levels in real time operations of the vehicle.

Example approaches, techniques, and mechanisms are disclosed for assessing battery states of batteries. According to one embodiment, raw sensor data are collected from a battery module. The battery module includes a plurality of battery cells. Input battery features are extracted from the raw sensor data collected from the battery module. The input battery features are used to update node states of a graph neural network (GNN). The GNN include a plurality of GNN nodes each of which representing a respective battery cell in the plurality of battery cells. Estimation of one or more battery state of health (SoH) indicators is generated based at least in part on (e.g., reading out, etc.) individual output states of individual GNN nodes in the plurality of GNN nodes. The individual output states of individual GNN nodes in the plurality of GNN nodes are determined or read out based at least in part on the updated node states of the GNN.

In other aspects, the invention encompasses computer apparatuses and computer-readable media configured to carry out the foregoing techniques.

2.0. Structural Overview

Figure 2A:
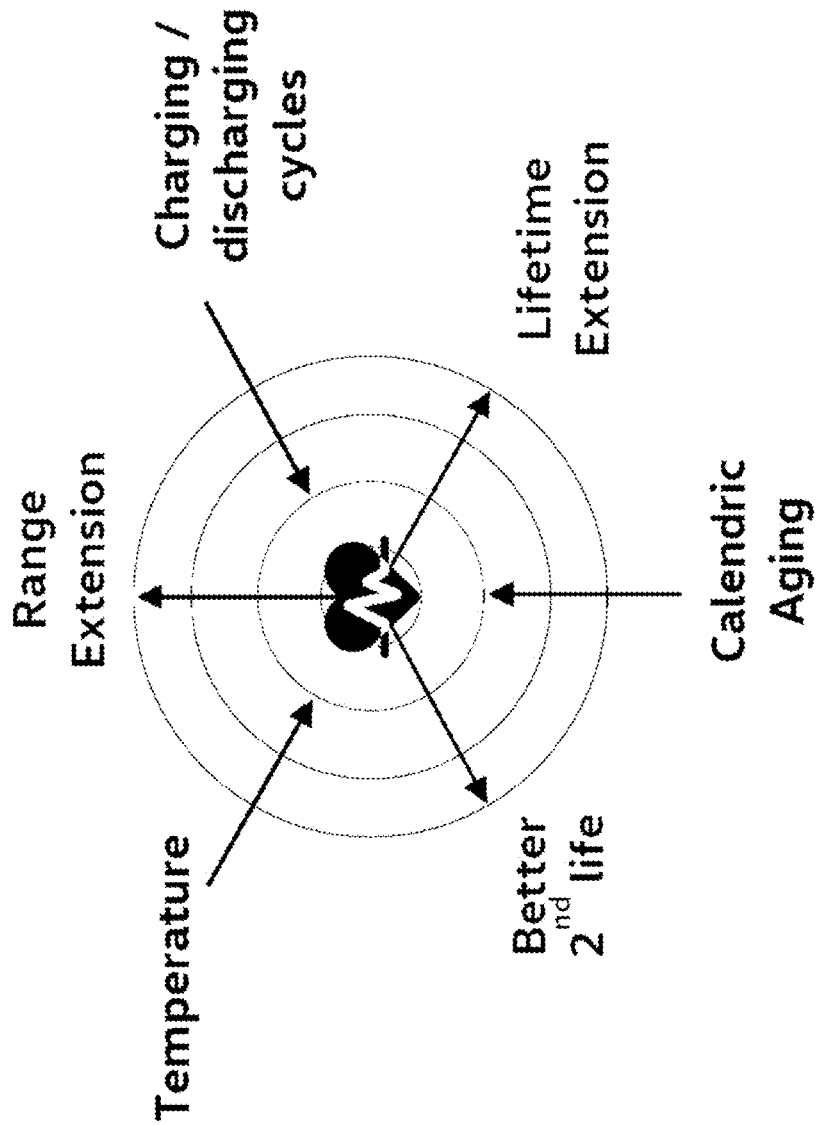
FIG. 2A and FIG. 2B illustrate example influences or influence factors on battery health and aging and electric vehicle driving range.

FIG. 2A illustrates example influences on battery health and aging. These influences include, but are not necessarily limited to only, temperature, calendric aging, charging/discharging cycles, and so on. As a first example, operating with temperatures higher than the optimal temperature range negatively affects the battery health, accelerate the battery aging, and reduce the total number of charging/discharging cycles. As a second example, calendric aging negatively affects the battery health, accelerate the battery aging, and reduce the total number of charging/discharging cycles, after a relatively long period elapses with or without vehicle operations. In addition, charging and discharging operations (e.g., deep discharging, prolonged electric currents, etc.) and the total number of past charging/discharging cycles also affect the battery health and aging.

A battery management system (BMS) can be used to monitor health and aging of a battery pack in an electric vehicle, help mitigate battery degradation, optimizing performance, reliability, and lifetime, and so on. The BMS can be deployed in-vehicle, out-of-vehicle, cloud-based, a combination of the foregoing, etc., to help reduce or prevent vehicle or battery operations at non-optimal temperatures, help initiate battery repair or replacement services to mitigate negative influences such as calendric aging, help reduce or prevent improper charging and discharging operations, etc. Hence, as illustrated in FIG. 2A, driving range, lifetime, better second life, etc., of the battery pack in the electric vehicle can be extended through remedial and preventive battery management operations enabled by the BMS.

Due to the battery pack's sensitivity to its operating conditions, the BMS can be used to generate information about the status and health of the battery pack using real time or near real time monitoring, use the information about the status and health of the battery pack to optimize battery operations and extend battery lifetime, and to ensure battery safety during vehicle and/or battery operations, such as preventing thermal runaway, fatal and/or sudden failures, operating outside operational or usage limits, etc. The BMS can be used to provide measurements of voltage, current and temperature at battery cell, module and pack levels in order to comply with battery usage limits. As a result, the battery pack can be protected from damage caused by improper vehicle or battery operations. The BMS can also be used to make sure that the battery pack operates as efficiently as possible by keeping it within its optimal conditions, for example, through cell balancing and applying climate system operations.

Under some approaches that do not implement techniques as described herein, a BMS system may overly rely on empirical knowledge by mathematically modeling identified physical and chemical mechanisms inside a single battery cell as well as the modularity assumption under which conclusions drawn from the single battery cell are unreasonably assumed to be generally applicable to all numerous cells in a battery pack. SoH estimations under these approaches are often neither accurate nor reliable.

In contrast, a BMS as described herein implements data-driven battery health prediction/estimation models that rely on neither the empirical knowledge used to mathematically model identified physical and chemical mechanism in a single cell nor the modularity assumption to unreasonably extend conclusions from a single cell to a battery pack of numerous cells.

In comparison with BMSs of other approaches, the BMS with the data-driven battery health prediction/estimation models can produce relatively accurate and timely SoH estimations of a battery pack. These models can implement supervised learning and automatically learn and capture underlying intra-cell, intra-module, inter-cell and/or inter-module battery features that influence battery health. In a training phase, these models can be trained with training data with labels or ground truths, purely, automatically, and with no or minimal user input. Hence, these battery health prediction/estimation models automatically learn relationships and effects of physical or chemical aging processes through training raw sensor data in the training data. In a model application or deployment phase, these models can be automatically driven by received or collected (non-training) raw sensor data for the purpose of monitoring, estimating and/or predicting the health of the battery system or pack within a BMS environment. In place of or in addition to other BMS system(s) generating other BMS data or calculations under other approaches, the BMS under techniques as described herein can be deployed in an electric vehicle or operating out-of-vehicle or externally with an in-vehicle system or device.

Figure 3A:
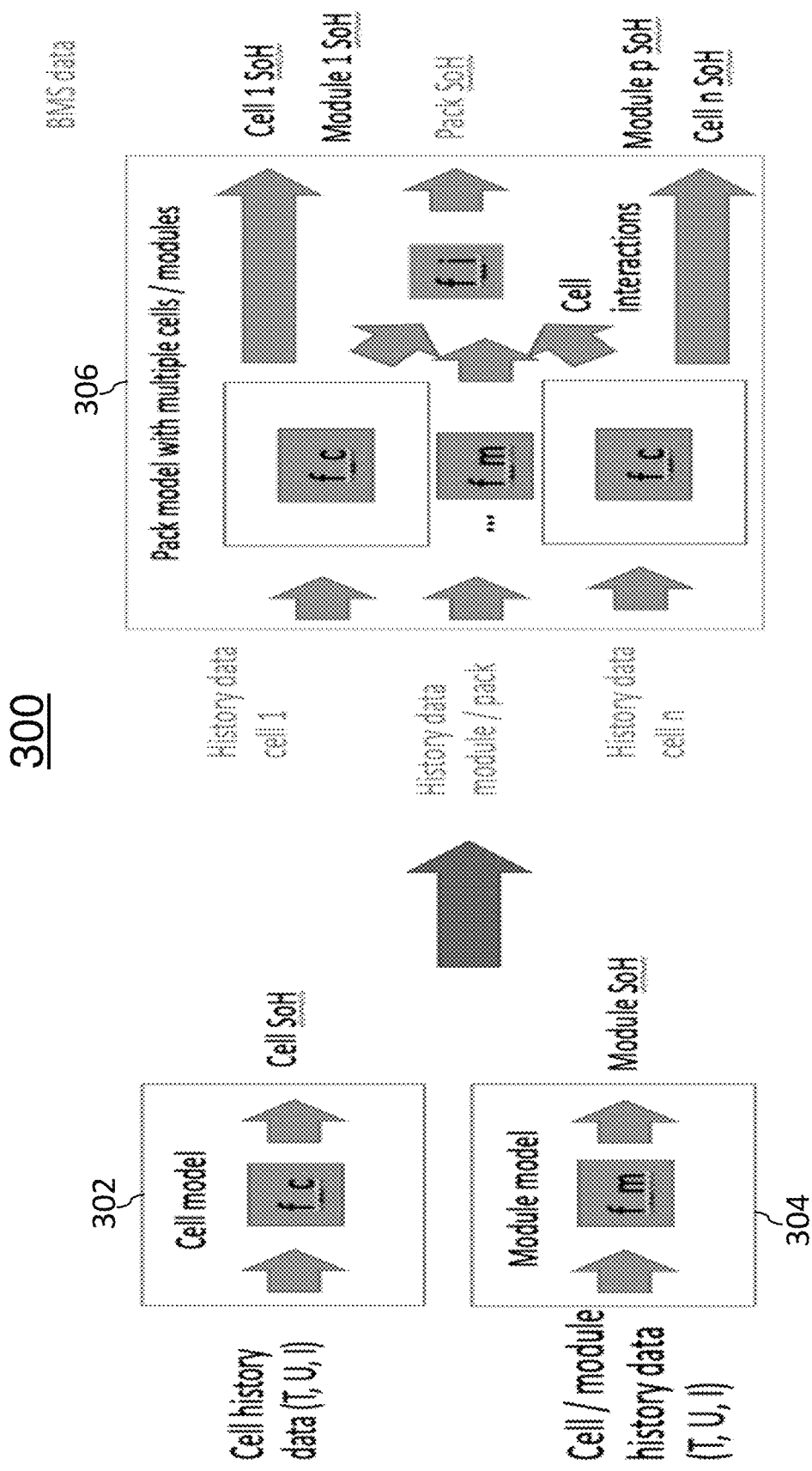
FIG. 3A illustrates an example framework for a battery management system.

FIG. 3A illustrates an example framework 300 for a battery management system (BMS). The framework (300) may be applied to monitoring battery health with respect to any in a wide variety of battery cells, modules and/or packs that may or may not share the same or similar adjacency information. These battery cells, modules and/or packs may be of the same or different types made by the same or different battery manufacturers and may be used in vehicles made by the same or different vehicle manufacturers with the same or different vehicle models.

The framework (300) includes or operates with a plurality of battery-cell-level models 302 (each denoted as "cell model") used to represent battery cells in a plurality of battery modules of a battery pack, a plurality of battery-module-level models 304 (each denoted as "module model") used to represent the plurality of battery modules, a battery-pack-level model 306 (denoted as "pack model") used to represent the battery pack, etc.

Each block, module, device, system, etc., illustrated in the framework (300) may be collectively or individually implemented with one or more computing devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The framework (300) may implement an overall hierarchical battery state model (HBSM) to estimate, predict and/or generate SoHs (denoted as "Cell 1 SoH," . . . "Cell n SoH," "Module 1 SoH," . . . "Module p SoH," "Pack SoH," respectively) at cell, module and/or pack levels. These SoHs at various battery levels can be generated or included in output data (denoted as "BMS data" in FIG. 3A) from the framework (300) or the HBSM implemented therein. The HBSM in the framework (300) may represent a hierarchy of battery health estimators or estimation models—such as the cell models (302), module models (304) and the pack model (306)—at the cell, module and/or pack levels.

The estimators or estimation models (302, 304, 306) of various battery levels can be built with machine-learning techniques such as artificial neural networks. These models may be individually and/or collectively trained with separate training processes for some or all neural network layers/modules, with an end-to-end training process for the entire framework, with a combination or mix of end-to-end training process(es) and separate training processes, etc. Some or all of the models can be trained with a relatively large training data in a model training phase.

Each of the battery cell models (302) may be implemented with neural network components to represent or approximate a non-linear function/mapping (denoted as "f_c") of battery cell level that maps battery cell history data or input to generate battery cell level SoHs or output. Each of the battery module models (304) may be implemented with neural network components to represent or approximate a non-linear function (denoted as "f_m") of battery module level that maps battery cell/module history data or input to generate battery module level SoHs or output. The battery pack model (306) may be implemented with neural network components as a combination, hybrid or hierarchy of the battery cell and module models (302, 304) to map battery cell/module/pack history data or input to generate battery cell/module/pack level SoHs or output. The battery pack model (306) may be used to model, represent or approximate underlying physical interactions such as electric and thermal interactions, etc., among neighboring battery cells/modules—in a pure data driven way—as function(s) (denoted as "f_i") of neighboring/adjacent node (e.g., cell/module) interactions in graph neural networks, graph attention networks, etc.

Optimized operational parameters such as weights and biases used in the neural network components implementing these estimators or estimation models (302, 304, 306) can be optimized in the model training phase with training data generated, measured and/or labeled from field/driving data (collected in the field while driving or performing vehicle operations and labeled with ground truths automatically and/or manually) alone, from lab data (acquired in the lab environment), or a combination of the field/driving data and lab data. The ground truths or labels can be derived from actual battery performance measurements and/or generated from battery performance predictions/estimations made by an available BMS system (e.g., under the same approach or under other approaches, a deployed system with a vehicle, etc.).

Example training data may include, but are not necessarily limited to only, time series data for voltage, current, temperature, charge (after a full or partial charging cycles), internal resistance, etc. Raw sensor data (e.g., voltage time series data, current time series data, temperature series data, etc.) at the cell and module levels in the training data may be used by the estimators (302, 304) to generate input training features at the cell and module levels, which can then be used by the estimators (302, 304) to generate training estimations/predictions of SoHs at the cell and module levels. For example, cell history data (T, U, I) in the training data may be used to train the cell estimation models (302) and generate training estimations/predictions (denoted as "Cell SoH") at the cell level. Additionally, optionally or alternatively, a combination of cell/module history data (T, U, I) in the training data may be used to train the module estimation models (304) and generate as training estimations/predictions (denoted as "Module SoH") at the module level.

The estimations/predictions of SoHs (e.g., charge, internal resistance, etc.) at the cell and module levels can be compared with ground truths or labels (e.g., charge time series data, internal resistance time series data, etc.) in the training data at the cell and module levels, respectively. Differences or errors between the estimations/predictions and the ground truths, as measured with one or more distance, error, cost, or penalty functions, may be used (e.g., via back propagation, etc.) to optimize the operational parameters such as weights and biases used in the respective neural networks (e.g., implemented in the cell models (302), in the module models (304), etc.) to minimize subsequent or future prediction or estimation errors from these neural networks or cell and module estimation models (302, 304).

The estimators (302, 304) at the cell and module levels can be combined into a specific hierarchy formed by multiple (or pluralities of) cells/modules to build the estimator or estimation model (306) at the pack level. The specific hierarchy used to build the pack estimation model (306) can be specified, defined or designated to (e.g., graphically, etc.) represent, mimic, reflect, or take into account, inter-cell and inter-module interactions, relations and adjacencies among the cells and modules that constitute the battery pack. As noted, the battery cell and module models and their interactions represented in the hierarchy are neural network components. Hence, the operations of the hierarchy can be purely data driven in both the model training and the model application phases.

More specifically, operational parameters used in the pack estimation model (306) can be trained and optimized with field/driving data or labeled data with ground truths in the training data, for example end-to-end along with cell and module model training. The field/driving data may include raw sensor data at the pack level, raw sensor data at cell and module levels, measured or labeled SoHs, etc., from driving data (such as data originated from vehicle operations from a population of electric vehicles) collected from field or vehicles.

The field/driving data may include raw sensor data (e.g., voltage time series data, current time series data, temperature series data, etc.) collected from cells/modules of battery pack(s) in the same or similar hierarchy layout(s), in the same or similar cell layout(s), in the same or similar module layout(s), etc. The field/driving data such as cell history data (denoted as "History data cell 1" through "History data cell n", for n cells) and module/pack history data (denoted as "History data module/pack") may be used by the pack estimation model (306) to generate input training features at the cell, module and pack levels such as cell level input features, module level input features, pack level input features, etc. These generated input training features can then be used by the pack estimation model (306) to generate training estimations/predictions of SoHs at the cell, module and pack levels such as "Cell 1 SoH," . . . "Cell n SoH," "Module 1 SoH," . . . "Module p SoH," "Pack SoH," etc.

The training estimations/predictions of SoHs at the cell, module and pack levels can be compared with the ground truths or labels in the field/driving data at the cell, module and pack levels, respectively. Differences or errors between the estimations/predictions and the ground truths, as measured with one or more distance, error, cost, or penalty functions, may be used (e.g., via back propagation, etc.) to optimize operational parameters such as weights and biases used in the neural networks implemented in the pack model (306) to minimize subsequent or future prediction or estimation errors from these neural networks or the pack estimation model (306).

In a model application phase, the hierarchical pack estimation model (306) can operate with the optimized operational parameters to process collected raw sensor data (e.g., non-training field data, non-training data, raw sensor data collected during vehicle applications or operations, etc.) to concurrently and/or serially generate individual estimations/predictions of the SoHs for individual battery cells in the battery pack, individual battery modules in the battery pack, and the battery pack itself.

In some operational scenarios, the SoH estimation at the pack level can be used by the BMS incorporating or operating in conjunction with the pack estimation model (306) to assess how much power and energy for vehicle propulsion and other subsystems in the electric vehicle are available. The SoH estimation at all levels can be used by the BMS to assess whether the vehicle or the battery system is operating optimally, normally, abnormally, etc. As noted, a reliable SoH estimation enables efficient utilization of the battery pack, which as an example can lead to lower costs due to optimization of battery or battery pack size. In addition, battery usage can be optimized to maintain or enhance the battery pack's SoH and enable extended battery lifetime than otherwise. For example, cells and/or modules that have poor or low SoH values can be replaced modules as a cheaper alternative to replace the entire battery pack. In addition, SoH values can be used to perform battery cell or module balancing and save or preserve energy in specific battery cells or modules or distribute loads based on battery health as indicated by SoH estimations/predictions.

2.1. Time Series Forecasting

Raw sensor data collected with a battery pack as described herein may be represented as one or more time series. A time series refers to a series or sequence of (e.g., consecutive, etc.) data points (of time-dependent variables) indexed or listed in time order. For example, electric voltage measurements (in the collected raw sensor data) made by a physical (or specifically voltage) sensor deployed with a cell or a module in the battery pack or the battery pack itself can generate a time series of voltage measurements at a corresponding cell, module or pack level. Electric current measurements (in the collected raw sensor data) made by a physical (or specifically current) sensor deployed with a cell or a module in the battery pack or the battery pack itself can generate a time series of current measurements at a corresponding cell, module or pack level. Temperature measurements (in the collected raw sensor data) made by a physical (or specifically temperature) sensor deployed with a cell or a module in the battery pack or the battery pack itself can generate a time series of temperature measurements at a corresponding cell, module or pack level. Additionally, optionally or alternatively, other time series such as time series of internal resistance, electric charge, electric charge capacity, pressure, etc., can be generated from measurements of respective physical sensors. Additionally, optionally or alternatively, some time series can be derived, for example based on physics laws and/or mathematical models, from some other time series generated from measurements of physical sensors.

Multiple and/or multivariate time-series forecasting may be used to process multiple input time series (e.g., history time series, cell history data, module history data, pack history data, cell interaction data, module interaction data, etc.) represented in the raw sensor data to generate estimations or predictions of individual and/or collective SoHs at cell, module and pack levels as multiple output time series (e.g., cell SoHs, module SoHs, pack SoH(s), etc.).

The HBMS system can make relatively accurate SoH predictions or forecasts by taking into account both intra-series temporal correlations and inter-series correlations simultaneously among (e.g., input, history, etc.) time-series data. The specific hierarchy of cells and modules in the system as described herein can be used to aggregate raw sensor data as well as derived information from all cells within a module, and all modules within the battery pack, etc. As noted, the system as described herein can incorporate a specific hierarchy of cells and modules in the battery pack by representing and considering relations among the cells and modules, instead of relying on an assumption of modularity based on node regression with respect to a single cell under other approaches that do not implement techniques as described herein.

2.2. HBSM and Graph Neural Networks

The framework (300) of FIG. 3A can be implemented with graph neural networks (GNNs) at different levels inside the battery pack. Under the framework (300), an HBSM used to represent a battery pack includes multiple GNN components or multiple GNNs used to represent multiple battery cells and modules constituting the battery pack. Each of the GNN components describes or represents a respective battery cell or module in the multiple battery cells or modules of the battery pack as a respective GNN in the multiple GNNs. The multiple GNN components representing the multiple battery cells and modules of the battery pack essentially form an undirected graph or a graph network to describe the battery pack.

Inside the HBSM for the battery pack, two different types of GNN components can be employed: (i) battery cell components or GNNs at the battery cell level at which battery cells are represented or implemented as GNN nodes respectively, and (ii) battery module components or GNNs at the battery module level at which modules are represented or implemented as nodes respectively.

In the model training phase, the HBSM including the GNN components can be first trained or optimized for SoH estimation with adaptive or supervised graph-based machine learning. In the model application or deployment phase, the HBSM can output SoHs for every cell and module in the battery pack as well as globally for the battery pack itself.

2.3. Battery Cells as GNN Nodes in Module Level GNN

Figure 3B:
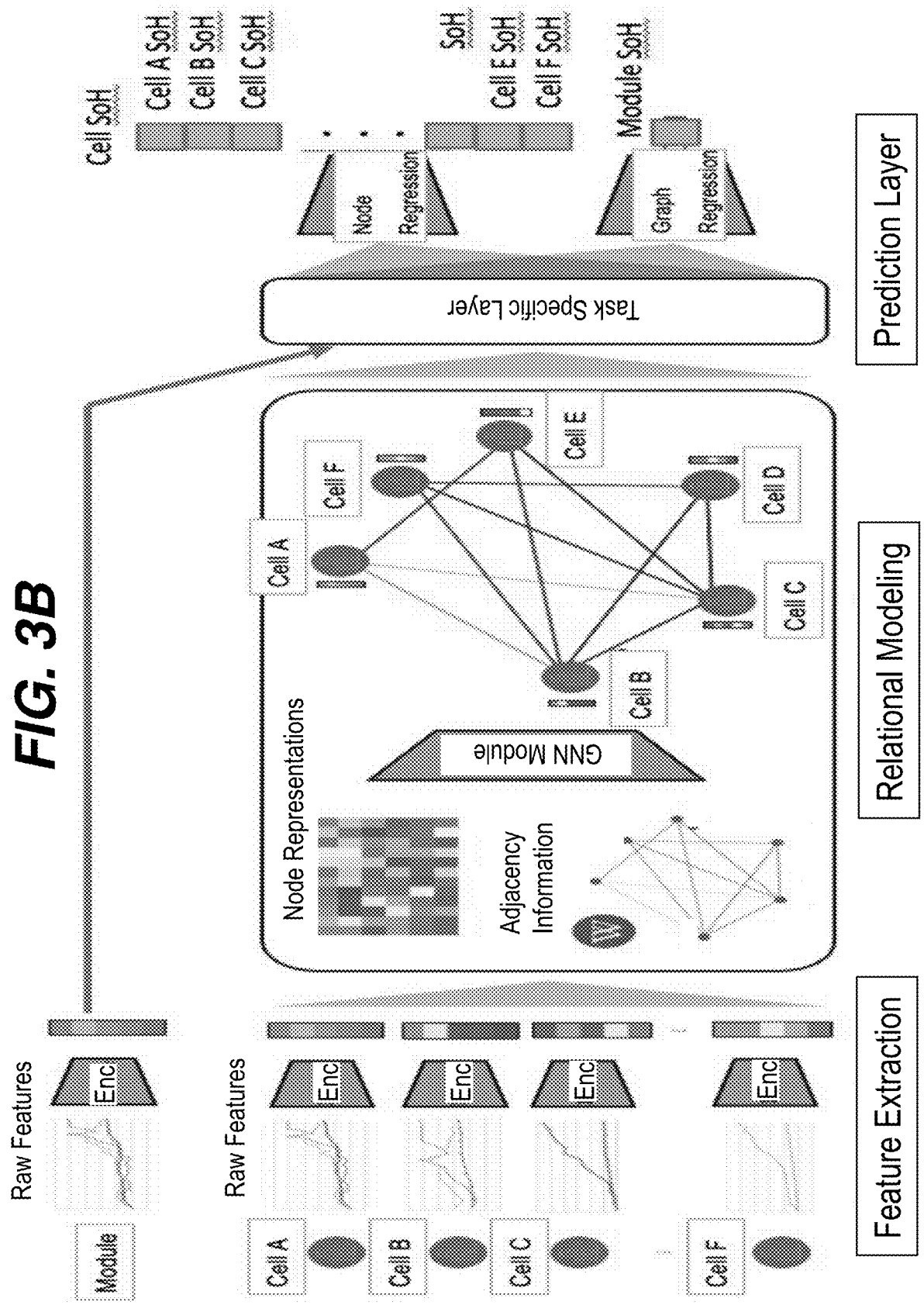
FIG. 3B and FIG. 3C illustrate example representations of battery module and battery pack in a hierarchical battery state model.

FIG. 3B illustrates an example representation of a battery module or a battery module type in which battery cells share the same or similar adjacency information in the HBSM under the framework (300). As shown, adjacency or physical connection relations among all battery cells in the battery module can be represented or captured through relational modeling implemented with a GNN generation module denoted as "GNN Module" in FIG. 3B.

Adjacency information among nodes representing all the battery cells in the battery module may be specified or defined based at least in part on a physical (e.g., spatial, electrical, thermal, etc.) layout of the battery cells inside the battery module. A node list enumerating all the nodes or the battery cells in the battery module with the adjacency information can be used by the GNN generation module ("GNN Module") to build or initialize a graph neural network in which the battery cells are represented as GNN nodes of the graph neural network. For the purpose of illustration only, as shown in FIG. 3B, the battery cells in the battery module may include Cell A through Cell F. Edges or connections in the graph neural network may be built or initialized based at least in part on the adjacency information.

Raw sensor data denoted as "Raw features" in FIG. 3B, such as multiple raw data time series for the battery module and cells (e.g., Cell A through Cell F, etc.) therein, may be generated by physical sensors deployed with the battery module and cells and received by a feature extraction layer comprising a plurality of encoders (denoted as "Enc"; e.g., auto-encoders) or encoder instances (e.g., combinations of 1D CNNs, LSTMs/GRUs, dense neural network layers, etc.). The feature extraction layer compresses or converts the raw cell and module features into input cell and module features (e.g., represented in multiple time series, etc.).

Node representations for all the battery cells or nodes in the graph neural network for the battery module can be initialized with the input cell features or the input features at the cell level, as extracted by the encoders in the feature extraction layer. Each battery cell or node in the graph neural network can selectively aggregate information in the input cell features based on the (e.g., spatial, graphical, physical, adjacency, etc.) relations represented in the graph neural network among the battery cells (e.g., neighboring cells, etc.) and add the information to the node representation of the (each) battery cell or node.

The node representations with the added information—as well as pooled graph level output data—can then be fed into a task specific (e.g., prediction, estimation, regression, etc.) module as input. In addition, the input (global) features extracted by the feature extraction layer from raw sensor data at the module level can be fed into the task specific module as additional input. The task specific module can include specific neural network layers to perform node and graph regression tasks to generate predictions or estimations of SoHs at every battery module and SoH(s) at the pack level.

In the model training phase, training input cell and module features or multiple training input time series from the encoders of the prediction layer can be used as input to the graph neural network as well as attendant neural network layers such as the feature extraction layer, the task specific module implementing node and graph regression tasks, etc., to train the graph neural network and attendant neural network layers to generate optimized values for operational parameters in the graph neural network and attendant neural network layers, for example by way of minimizing prediction errors between training predictions/estimations generated from a training dataset and ground truths in the training dataset.

In the model application or deployment phase, (non-training) input cell and module features or multiple input time series extracted by the encoders of the prediction layers from the raw sensor data can be used as input to the graph neural network as well as the attendant neural network layers—operating or being populated with the optimized values for the operational parameters in the graph neural network and attendant neural network layers—to generate (non-training) predictions/estimations of SoHs at cell and module levels.

The SoHs at the cell level or Cell SoHs may include SoHs for all the battery cells in the battery module, namely, Cell A SoH through Cell F SoH, as generated by the node regression tasks implemented with the task specific module operating with the graph neural network. The SoH at the battery module level or Module SoH may include a Module SoH for the battery module itself, as generated by the graph regression task implemented in the task specific module operating with the graph neural network.

2.4. Battery Module as GNN Nodes in Pack Level GNN

Figure 3C:
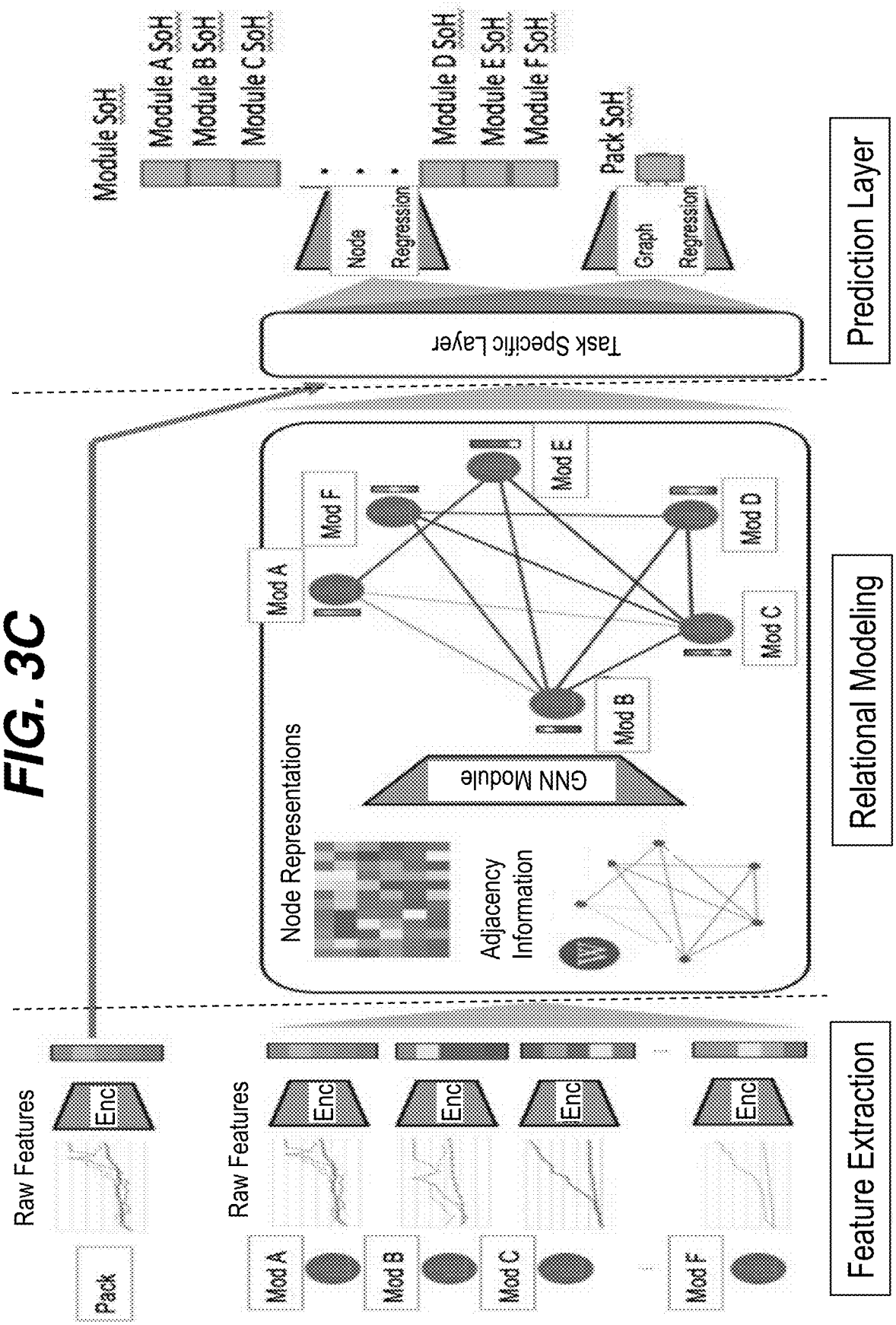

FIG. 3C illustrates an example representation of a battery pack or a battery pack type in which battery modules share the same or similar adjacency information in the HBSM under the framework (300). As shown, relations among all battery modules in the battery pack are captured through relational modeling implemented with a GNN generation module denoted as "GNN Module" in FIG. 3C.

Adjacency information among nodes representing all the battery modules in the battery pack may be specified or defined based at least in part on a physical (e.g., spatial, electrical, thermal, etc.) layout of the battery modules inside the battery pack. A node list enumerating all the nodes or the battery modules in the battery pack with the adjacency information can be used by the GNN generation module ("GNN Module") to build or initialize a (pack level) graph neural network in which the battery modules are represented as GNN nodes of the graph neural network. For the purpose of illustration only, as shown in FIG. 3C, the battery modules in the battery module may include Mod A through Mod F. Edges or connections in the graph neural network may be built or initialized based at least in part on the adjacency information.

Raw sensor data (denoted as "Raw features") such as multiple raw data time series for the battery pack and battery modules (e.g., Mod A through Mod F, etc.) therein may be generated by physical sensors deployed with the battery pack, module and cells and received by a feature extraction layer comprising a plurality of encoders (denoted as "Enc"; e.g., auto-encoders) or encoder instances (e.g., combinations of 1D CNNs, LSTMs/GRUs, dense neural network layers, etc.). The feature extraction layer compresses or converts the raw cell, module and pack features into input cell, module and pack features (e.g., represented in multiple time series, etc.).

Node representations for all the battery modules or nodes in the graph neural network for the battery pack can be initialized with the input battery module features or the input features at the module level, as extracted by the encoders in the feature extraction layer. Each battery module or node in the graph neural network can selectively aggregate information in the input battery module features based on the (e.g., spatial, graphical, physical, adjacency, etc.) relations represented in the graph neural network among the battery modules (e.g., neighboring modules, etc.) and add the information to the node representation of the (each) battery module or node.

The node representations with the added information—as well as pooled graph level output data—can then be fed into a task specific module as input. In addition, the input (global) features extracted by the feature extraction layer from raw sensor data at the pack level can be fed into the task specific module as additional input. The task specific module can perform node and graph regression tasks to generate predictions or estimations of SoHs at every cell (from the node regression tasks implemented by the task specific module) and SoH(s) at the module level (from the graph regression task implemented by the task specific module).

In the model training phase, training input cell, module and pack features or multiple training input time series from the encoders of the prediction layer can be used as input to the graph neural network as well as attendant neural network layers such as the feature extraction layer, the task specific module implementing node and graph regression tasks, etc., to train the graph neural network and attendant neural network layers to generate optimized values for operational parameters in the graph neural network and attendant neural network layers, for example by way of minimizing prediction errors between training predictions/estimations generated from a training dataset and ground truths in the training dataset.

In the model application or deployment phase, non-training input cell, module and pack features or multiple input time series from the encoders of the prediction layers can be used as input to the graph neural network as well as the attendant neural network layers—operating or being populated with the optimized values for the operational parameters in the graph neural network and attendant neural network layers—to generate (non-training) predictions/estimations of SoHs at cell, module and pack levels.

As shown in FIG. 3C, the SoHs at the cell level or Cell SoHs may include SoHs for all the battery cells in each battery module, namely, Cell A SoH through Cell F SoH, as generated by node regression tasks implemented in a task specific module operating with a graph neural network representing the battery cells of each such battery module. The SoHs at the module level may include Module A SoH through Module F SoH for the battery modules Mod A through Mod F, respectively, as generated by the node regression tasks implemented in the task specific module. The SoH at the pack level may include a Pack SoH for the battery pack itself, as generated by the graph regression task implemented in the task specific module.

3.0. Functional Overview

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Feature Extraction

Graph neural networks as illustrated in FIG. 3B and FIG. 3C may be regarded or deemed as spatial-temporal graphs in which graphic or spatial configurations (e.g., adjacency information, etc.) of nodes in the graph neural networks are relatively static or time invariant, while (e.g., hidden, latent, readout, SoH, etc.) states of the nodes are dynamic or time varying, for example depending on or covariant with preceding (e.g., hidden, latent, readout, SoH, etc.) states of the nodes as well as input features generated in feature extraction.

When individual battery cells of a battery module are represented as GNN nodes in a graph neural network at the battery module level as illustrated in FIG. 3B, input cell or node features—which serve as input to the graph neural network at the battery module level—of each battery cells represented in the graph neural network can represent the current (input) state of the battery cell. This current input state of the battery cell can be combined with hidden or latent states of nodes representing the battery cell and other battery cells maintained in the graph neural network to produce SoH movements (or differences in time), changes or variations inside the battery module for the purpose of predicting or estimating current SoHs of the battery cells, the adjacent battery cells and/or the battery module itself.

Likewise, when individual battery modules of a battery pack are represented as GNN nodes in a graph neural network at the battery pack level as illustrated in FIG. 3C, input battery module or node features—which serve as input to the graph neural network at the battery pack level—of each battery modules represented in the graph neural network can represent the current input state of the battery module. This current input state of the battery module can be combined with hidden or latent states of nodes representing the battery module and other battery modules maintained in the graph neural network to produce SoH movements, changes or variations inside the battery pack for the purpose of predicting or estimating current SoHs of the battery module, the adjacent battery modules and/or the battery pack itself.

As shown in FIG. 3B and FIG. 3C, feature extraction, relational modeling and task specific modules may be used in conjunction with representing battery cells and modules as two types of node components in the two types of graph neural networks at the battery module level and the battery pack level.

Figure 3D:
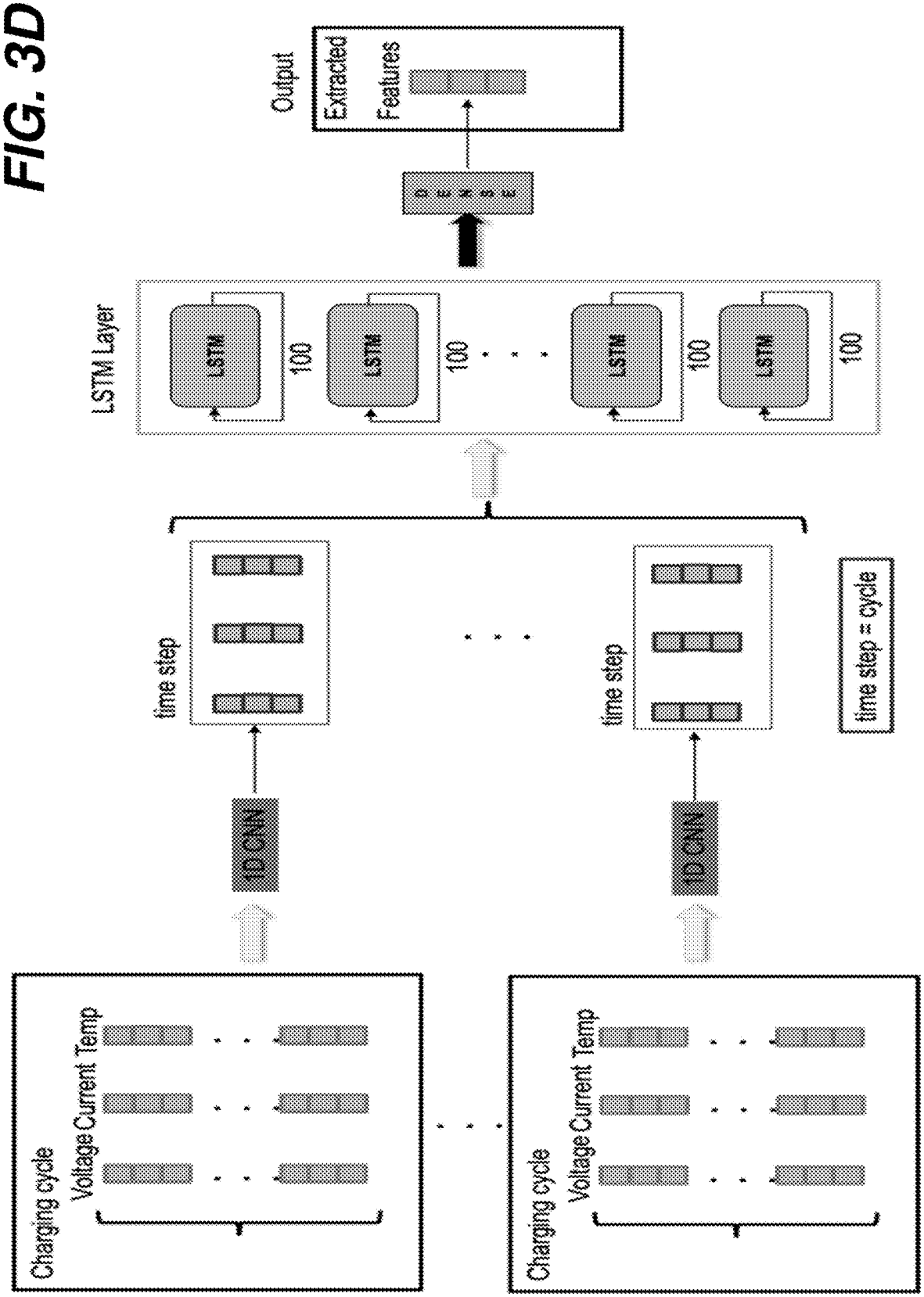
FIG. 3D illustrates example input feature extraction for battery state prediction.

FIG. 3D illustrates example input feature extraction (of a feature layer or encoders therein) implemented with a combination (or a hybrid model) of one-dimensional convolutional neural networks (1D CNNs) and long short term memory neural networks (LSTMs) that can be used to extract input features from raw time series data (e.g., raw sensor data such as voltage denoted 'U', current denoted as 'I', temperature denoted as 'T', etc.) of battery cells as depicted in FIG. 3B and of battery modules as depicted in FIG. 3C.

The input features extracted from the raw time series data (indicating past SoH movements therein) by the feature extraction (e.g., as shown in FIG. 3D, etc.) include a plurality of sets of input features of all battery cells in a battery module or a plurality of sets of input features of all battery modules in a battery pack. Each set in the plurality of input features of all the battery cells in the battery module or all the battery modules in the battery pack represents the current (input) state of a corresponding battery cell in all the battery cells of the battery module or the current (input) state of a corresponding battery module in all the battery modules of the battery pack.

By way of example but not limitation, the raw time series data (or the raw sensor data) may be a plurality of sets of time sequences or series of observables or physical quantities such as Current, Voltage, Temperature, etc., acquired by physical sensors during charging and/or discharging cycles (e.g., collected in driving or vehicle operations, collected in deep discharging operations depending on battery types, etc.) for a plurality of nodes represented in the graph neural network of FIG. 3B or FIG. 3C. Each set of time sequences or series of the observables may include observations or measurements of the observables for a respective node in the plurality of nodes.

Each time series (e.g., Voltage, etc.) for a set of time sequences or series of the observables for a node of the graph neural network of FIG. 3B or FIG. 3C may be received and processed (in parallel and/or series with other time series of the node or other nodes) by an 1D CNN as input to extract initial input features for the current (e.g., the latest, following the last extracted time step, etc.) time step in a plurality of (e.g., consecutive, etc.) time steps covering a time duration (e.g., hours, days, weeks, months, years, of vehicle applications or operations, etc.) represented in the time series. The 1D CNN may be implemented or configured with a (e.g., fixed, trainable, etc.) filter of a 1D filter kernel of a size representing a (moving) time window to extract the initial features (denoted as "time step" or equivalently "cycle") from the time series within the time window corresponding to the size of the filter kernel. In some operational scenarios, operational parameters such as coefficients of the filter used in the 1D CNN may be learned or optimized in the model training phase, while the size of the filter representing the length of the time window may be fixed or pre-configured.

Hence, a plurality of sets of initial input features are generated by the 1D CNNs for the current time step for all the nodes represented in the graph neural network of FIG. 3B or FIG. 3C. In addition, initial input features derived from a raw sensor data time series of a specific observable type (e.g., Voltage, etc.) for each node of all the nodes over time (e.g., over the plurality of time steps, etc.) form or constitute a time series or sequence of initial input features for the node.

The plurality of sets of initial input features for the current time step (or each time step in the plurality of time steps) can then be received and processed by the LSTMs to generate intermediate input features for the current time step for all the nodes. Each LSTM can be used to learn time dependency (with both long and short memory) among a time series of initial input features or a corresponding time series of raw sensor data time series of a specific observable type (e.g., Voltage, etc.) used to derive the time series of initial input features. In some operational scenarios, memory or state of the time series of initial input features accumulated over a moving time window such as a certain length or number—e.g., 100 (as shown in FIG. 3D), 150, 200, fixed, preconfigured, dynamically configured, variable, data from history cycles relative to the current cycle, data from future cycles relative to the current cycle, or data from a combination of history or future cycles, etc.—of time steps or data points may be retained or maintained by the LSTMs. Hence, relatively long history/past SoH related movements in time series data represented in the raw sensor data can be learned or captured by the feature extraction as described herein.

As a result, a plurality of sets of intermediate input features are generated by the LSTMs for the current time step for all the nodes represented in the graph neural network of FIG. 3B or FIG. 3C. In addition, intermediate input features derived from a time series of initial input features for each node of all the nodes over time (e.g., over the plurality of time steps, etc.) form or constitute a time series or sequence of intermediate input features for the node.

The plurality of sets of intermediate input features for the current time step (or each time step in the plurality of time steps) can then be received and processed by one or more dense neural network layers to generate (e.g., output, finalized, etc.) input features to the graph neural network for the current time step for all the nodes. Each LSTM can be used to perform data transformation or combination (e.g., linear combination, etc.) of the intermediate input features to generate the final input features (denoted as "Extracted Features") of each node in a compressed or compact form.

The final input features ("Extracted Features") can then be used as input into the graph neural network of FIG. 3B or FIG. 3C as node representations.

Additionally, optionally or alternatively, in some operational scenarios, gated recurrent unit neural networks (GRUs; not shown) may be used in combination with the 1D CNNs to extract input features of battery cells (e.g., as depicted in FIG. 3B, etc.) or battery modules (e.g., as depicted in FIG. 3C, etc.) in place of, or in addition to, the LSTMs. GRUs may be more efficient than LSTMs in performing time series tasks, tunning or training. When the LSTM contains a relatively large number of layers, it may be more challenging to train LSTM due to potential vanishing gradient issues.

In some operational scenarios, LSTMs can be used for SoH prediction/estimation or related feature extraction in connection with individual battery cells (e.g., as depicted in FIG. 3B, etc.). GRUs can be used for SoH prediction/estimation or related feature extraction in connection with individual battery modules (e.g., as depicted in FIG. 3C, etc.). Additionally, optionally or alternatively, one or more graph pooling layers may be used to receive output data from the LSTMs or GRUs to generate input features to the graph neural networks at battery module and pack levels.

3.2. Relational Modeling

A relational modeling component in a graph neural network may refer to a GNN node (each battery cell or node as depicted in the graph neural network of FIG. 3B) that represents a battery cell in a battery module, or alternatively refers to a node (each battery module or node as depicted in the graph neural network of FIG. 3C) that represents a battery module in a battery pack. The relational modeling component or node can implement node update functions so as to enable information (e.g., message, node state, etc.) exchanges between or among neighboring nodes of the neural network in relation to the relational modeling component or node (or the central/nexus node to the neighboring nodes).

In some operational scenarios, the graph neural network as described herein can be implemented as a graphical convolutional network (GCN) in which node update functions can be defined or specified to simply aggregate or collect inter-node information or messages across connection links between and among all battery cells of each battery modules and connection links between and among all battery modules within a battery pack. In these operational scenarios, information, messages or node states from the neighboring node of the node (or central/nexus node to the neighboring node) may be aggregated (e.g., via simple weighted or unweighted summation, with normalization to a specific value range, etc.) and added to a node representation of the node. As a result, the information from different neighboring and central nodes can be collected and effectively combined for each node of all the nodes in the graph neural network.

Additionally, optionally or alternatively, in some operational scenarios, relationships and/or relation types between or among nodes can be learned through graph attention networks in which each neural network layer is designed to learn or capture respective importance of neighboring nodes, relationships and relation types, instead of or in addition to using relatively static adjacency information to perform simple aggregation, summation and/or normalization of information from neighboring nodes and central/nexus node.

Figure 3E:
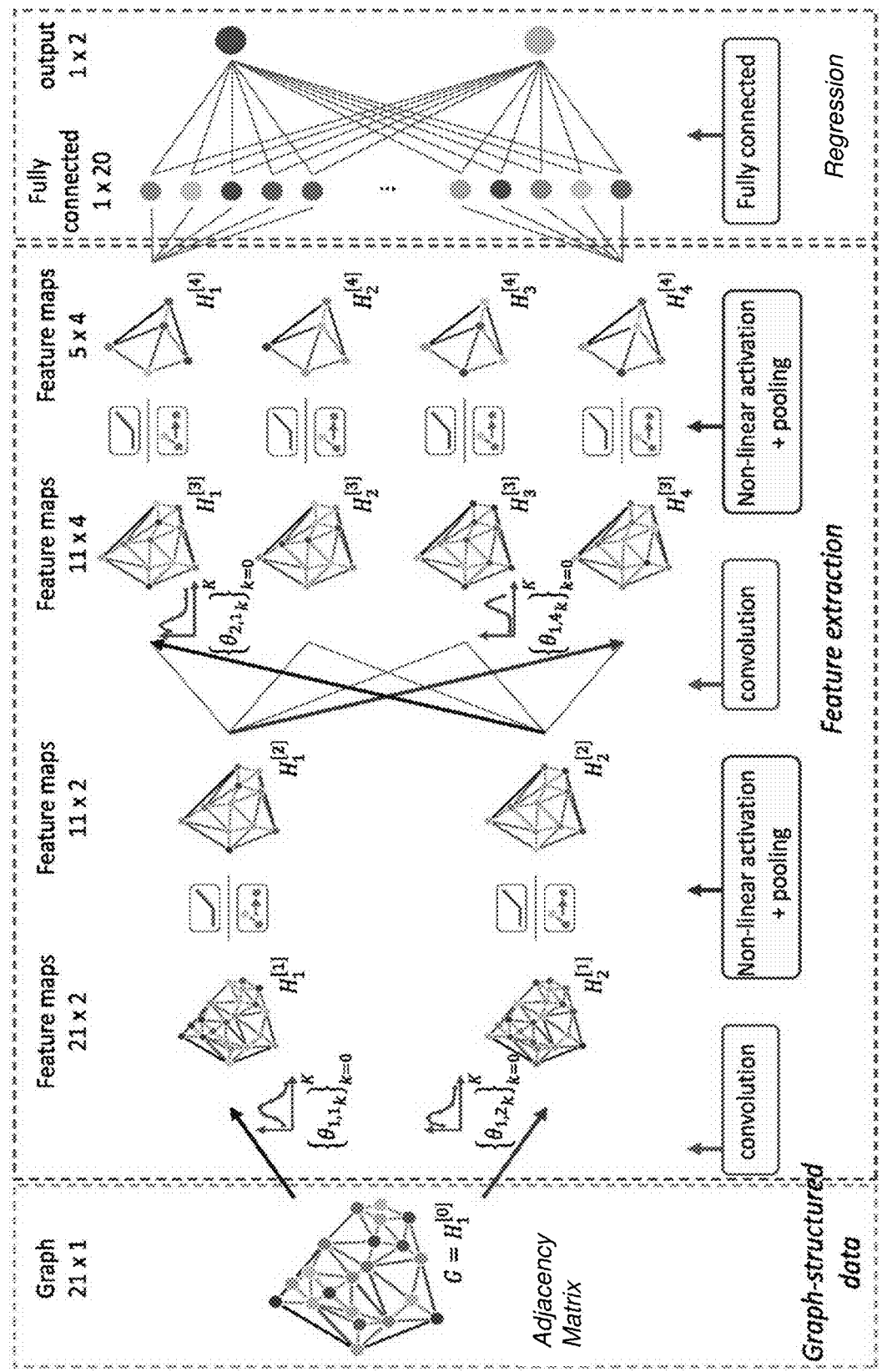
FIG. 3E illustrates example relational modeling.

FIG. 3E illustrates example relational modeling that can be implemented using GCN along with multiple convolutional, pooling and regression (prediction) neural network layers.

As shown, graph-structured data can be first generated for a graph comprising a plurality of nodes. For the purpose of illustration only, the graph includes 21 nodes. The graph-structured data includes an adjacency matrix (e.g., a normalized adjacency matrix, etc.) determined or generated based on adjacency information as well as input neurons (denoted as $H_1^{[0]}$) for the nodes, respectively, in the graph.

In some operational scenarios as illustrated in FIG. 3B, in which the nodes correspond to battery cells in a battery module, the adjacency matrix in the graph-structured data represents inter-cell relationships or (e.g., electrical, thermal, spatial, physical, etc.) connections between or among the battery cells. The input neurons in the graph-structured data may be input features extracted by the input feature extraction of FIG. 3D from battery cell level history data.

In some operational scenarios as illustrated in FIG. 3C, in which the nodes correspond to battery modules in a battery pack, the adjacency matrix in the graph-structured data represents inter-cell relationships or (e.g., electrical, thermal, spatial, physical, etc.) connections between or among the battery modules. The input neurons in the graph-structured data may be input features extracted by the input feature extraction of FIG. 3D from battery module level history data. Additionally, optionally or alternatively, the input neurons in the graph-structured data may be (e.g., linear, weighted, normalized, etc.) combinations of the input features extracted by the input feature extraction of FIG. 3D from battery module level history data and SoH estimations or predictions generated from graph neural networks (or instances of graph neural networks) respectively representing the battery modules.

As shown in FIG. 3E, the graph-structured data specified with the adjacency matrix and the input neurons (indicated as "graph 21×1" in FIG. 3E) can be received by a first graph convolutional neural network layer as input. For the purpose of illustration only, two convolutional filters (e.g., $\theta_{1,1}$, $\theta_{1,2}$, etc.) may be used by the first graph convolutional neural network layer to forward propagate the input neurons ($H_1^{[0]}$) into two first feature maps (indicated as "feature maps 21×2" in FIG. 3E). The two first feature maps (21×2) comprise two sets of first output neurons (denoted as $H_1^{[1]}$ and $H_2^{[1]}$, respectively) with inter-node connections specified by the same adjacency matrix as the input neurons ($H_1^{[0]}$).

The two first feature maps (21×2) specified with the adjacency matrix and the two sets of first output neurons ($H_1^{[1]}$ and $H_2^{[1]}$) can be received by a first pooling neural network layer with a non-linear activation function as input. For the purpose of illustration only, the two first feature maps (21×2) each of which includes 21 nodes may be reduced or pooled by the first pooling neural network layer into two first pooled feature maps (indicated as "feature maps 11×2" in FIG. 3E) each of which includes eleven (11) nodes. The two first pooled feature maps (11×2) comprise two sets of first pooled output neurons (denoted as $H_1^{[2]}$ and $H_2^{[2]}$, respectively) with inter-node connections specified by a pooled or reduced adjacency matrix generated by the first pooling neural network layer.

As shown in FIG. 3E, the two first pooled feature maps (11×2) specified with the two sets of first pooled output neurons ($H_1^{[2]}$ and $H_2^{[2]}$) and the pooled or reduced adjacency matrix of a reduced total number of (e.g., 11, etc.) nodes can be received by a second graph convolutional neural network layer as input. For the purpose of illustration only, two convolutional filters (e.g., $\theta_{2,1}$, $\theta_{1,4}$, etc.) may be used by the second graph convolutional neural network layer to forward propagate the two sets of first pooled output neurons ($H_1^{[2]}$ and $H_2^{[2]}$) into four second feature maps (indicated as "feature maps 11×4" in FIG. 3E). The four second feature maps (11×4) comprise four sets of second output neurons (denoted as $H_1^{[3]}$, $H_2^{[3]}$, $H_3^{[3]}$ and $H_4^{[3]}$, respectively) with inter-node connections specified by the same reduced or pooled adjacency matrix generated by the first pooling neural network layer.

The four second feature maps (11×4) specified with the reduced or pooled adjacency matrix and the four sets of second output neurons ($H_1^{[3]}$, $H_2^{[3]}$, $H_3^{[3]}$ and $H_4^{[3]}$) can be received by a second pooling neural network layer with a non-linear activation function as input. For the purpose of illustration only, the four second feature maps (11×2) each of which includes 11 nodes may be reduced or pooled by the second pooling neural network layer into four second pooled feature maps (indicated as "feature maps 5×4" in FIG. 3E) each of which includes five (5) nodes. The four second pooled feature maps (5×4) comprise four sets of second pooled output neurons (denoted as $H_1^{[4]}$, $H_2^{[4]}$, $H_3^{[4]}$ and $H_4^{[4]}$, respectively) with inter-node connections specified by a second pooled or reduced adjacency matrix generated by the second pooling neural network layer.

As shown in FIG. 3E, the four sets of second pooled output neurons ($H_1^{[4]}$, $H_2^{[4]}$, $H_3^{[4]}$ and $H_4^{[4]}$) can be fully connected to, and received or read out by, a dense neural network layer (indicated as "Fully connected 1×20") in the regression module as input. The dense neural network layer can transform and combine the output neurons ($H_1^{[4]}$, $H_2^{[4]}$, $H_3^{[4]}$ and $H_4^{[4]}$) into output neurons (indicated as "output 1×2" in FIG. 3E) for node and/or graph regression tasks.

3.3. Task Specific Module

After node representations are updated using the relational modeling, the node representations can be fed as input into task specific components in the task specific module. The task specific components can be specifically modelled and trained to perform any in a wide variety of tasks using the received node representations generated by the graph neural network.

By way of example but not limitation, two graph based learning tasks may be performed with the task specific components in the task specific module: SoH prediction or estimation for a node (in a graph neural network) such as an individual battery cell/module and SoH prediction or estimation for a prediction graph (implemented by the graph neural network) such as a battery module/pack.

In a node or battery cell component of the graph neural network of FIG. 3B, individual battery cell SoH prediction or estimation is the same as or similar to a node regression task. As a battery module includes multiple related battery cells, information on the current states (or node representations outputted by or read out from the graph neural network) of all individual nodes or battery cells in the battery module can be utilized in combination with global features of the battery module extracted at the module level to predict the SoH of the battery module, which is the same as or similar to a graph regression task.

Similarly, in a node or battery module component of the graph neural network of FIG. 3C, individual battery module SoH prediction or estimation is the same as or similar to a node regression task. As a battery pack includes multiple related battery modules, information on the current states (or node representations outputted by or read out from the graph neural network) of all individual nodes or battery modules in the battery pack can be utilized in combination with global features of the battery pack extracted at the pack level to predict the SoH of the battery pack, which is the same as or similar to a graph regression task.

Figure 3F:
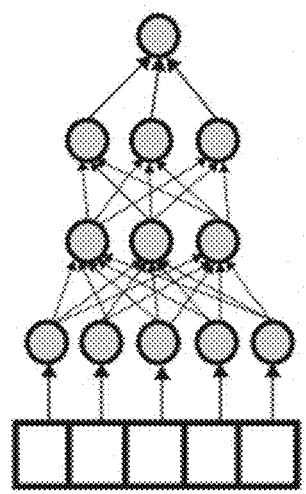
FIG. 3F and FIG. 3G illustrate example neural networks for node and graph regression tasks.

As illustrated in FIG. 3F, node level output data can be used as input to a (node) regression neural network to generate corresponding node level predictions or estimations. One or more dense neural network layers with linear activation functions may be used in an individual prediction layer for predicting/estimating a node-level SoH for a node of a graph neural network as described herein (e.g., a battery cell in FIG. 3B, a battery module of FIG. 3C, etc.).

Figure 3G:
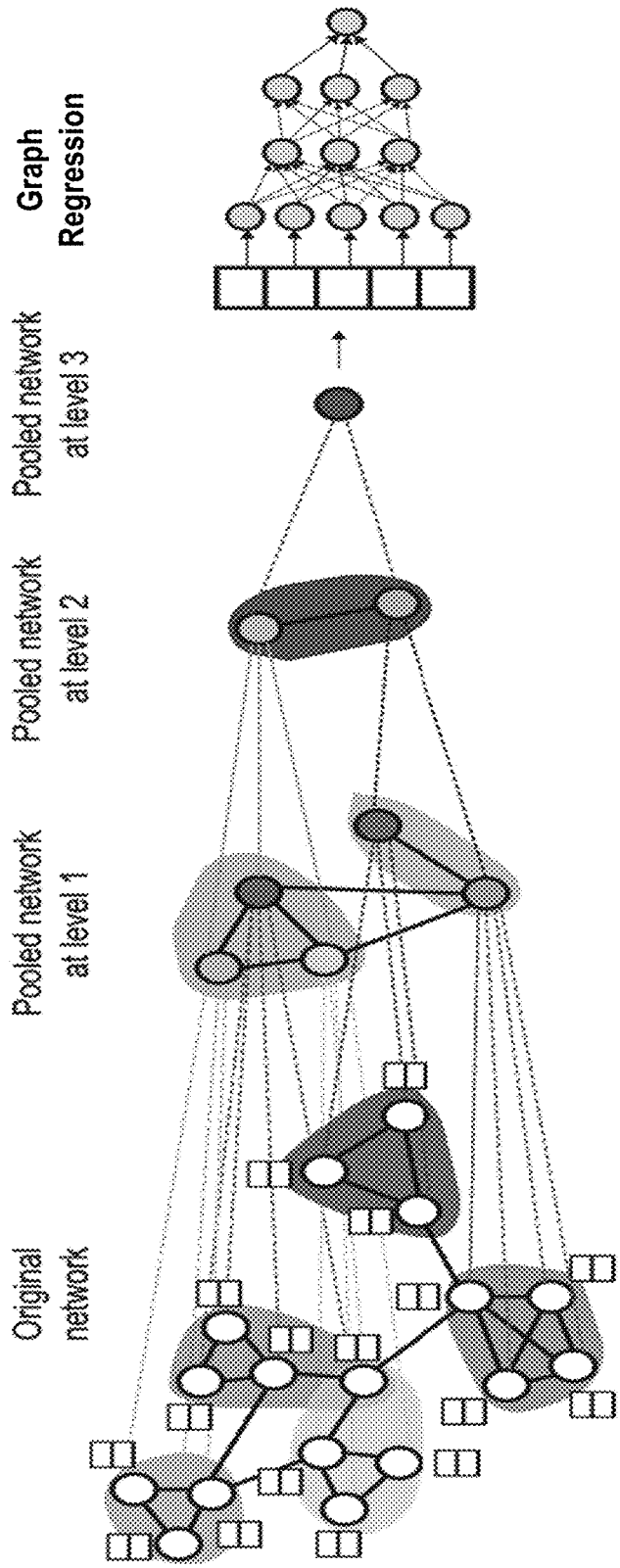

As illustrated in FIG. 3G, a plurality of pooling neural network layers—e.g., which generate reduced graphs or corresponding reduced pooled graph level data such as "Pooled network at level 1," "Pooled network at level 2," "Pooled network at level 3," etc.—can be used to process and reduce input graph-structure data of an original network or graph (e.g., which may include 21 nodes as illustrated in FIG. 3E, etc.) into graph level output data. The graph level output data can then be used as input to a (graph) regression neural network to generate corresponding graph level predictions or estimations. A representation of the entire graph may be obtained through aggregating node-level features, representations, states, etc., of some or all individual nodes for the purpose of predicting or estimating a graph-level SoH for the graph of the graph neural network (e.g., a battery module in FIG. 3B, a battery pack of FIG. 3C, etc.). Various graph pooling methods—which, for example, determine weighted or unweighted mean values, maximums, etc., of the node-level features, representations, states, etc., of some (e.g., a few topmost, etc.) or all the individual nodes in the graph—can be used to aggregate information (e.g., features, node representations, states, outputs read out from the graph neural network, etc.) of the individual nodes to represent the entire graph. By way of example but not limitation, mean pooling methods can be used to calculate a graph representation from the information of the individual nodes in the entire graph, followed by a regression layer for the graph-level SoH prediction/estimation task, for example for the battery module of FIG. 3B or for the battery pack of FIG. 3C.

Additionally, optionally or alternatively, for graph-level prediction/estimation of SoH(s), global features such as history data at the battery module level of FIG. 3B or at the battery pack level of FIG. 3C can be incorporated and processed as a part of input. Hence, the aggregated or pooled features obtained by graph pooling of individual nodes can be combined with the global features directly extracted by the feature extraction from the history data at the battery module level of FIG. 3B or at the battery pack level of FIG. 3C.

A plurality of neural network layers can be used in a graph neural network as described herein. In a non-limiting example, a graph neural network may be implemented as a graph convolutional network (GCN) with two convolution layer and one prediction layer.

Edges or inter-node connections can be captured or defined in accordance with a battery pack layout (e.g., including spatial, electric and/or thermal layout information, etc.) to create or construct an adjacency matrix such as a normalized adjacency matrix used in node updating function.

A wide variety of distance, error, cost and/or penalty functions/measures can be used to assess, evaluate, validate and/or minimize (e.g., via back propagation of errors to update weights and biases in various neural network layers, etc.) prediction or estimation errors in connection with SoH prediction/estimation model(s) as described herein. By way of example but not limitation, the prediction or estimation errors may be assessed or measured based on mean square errors or R-squared scores.

3.4. Example Use Cases

Figure 2B:
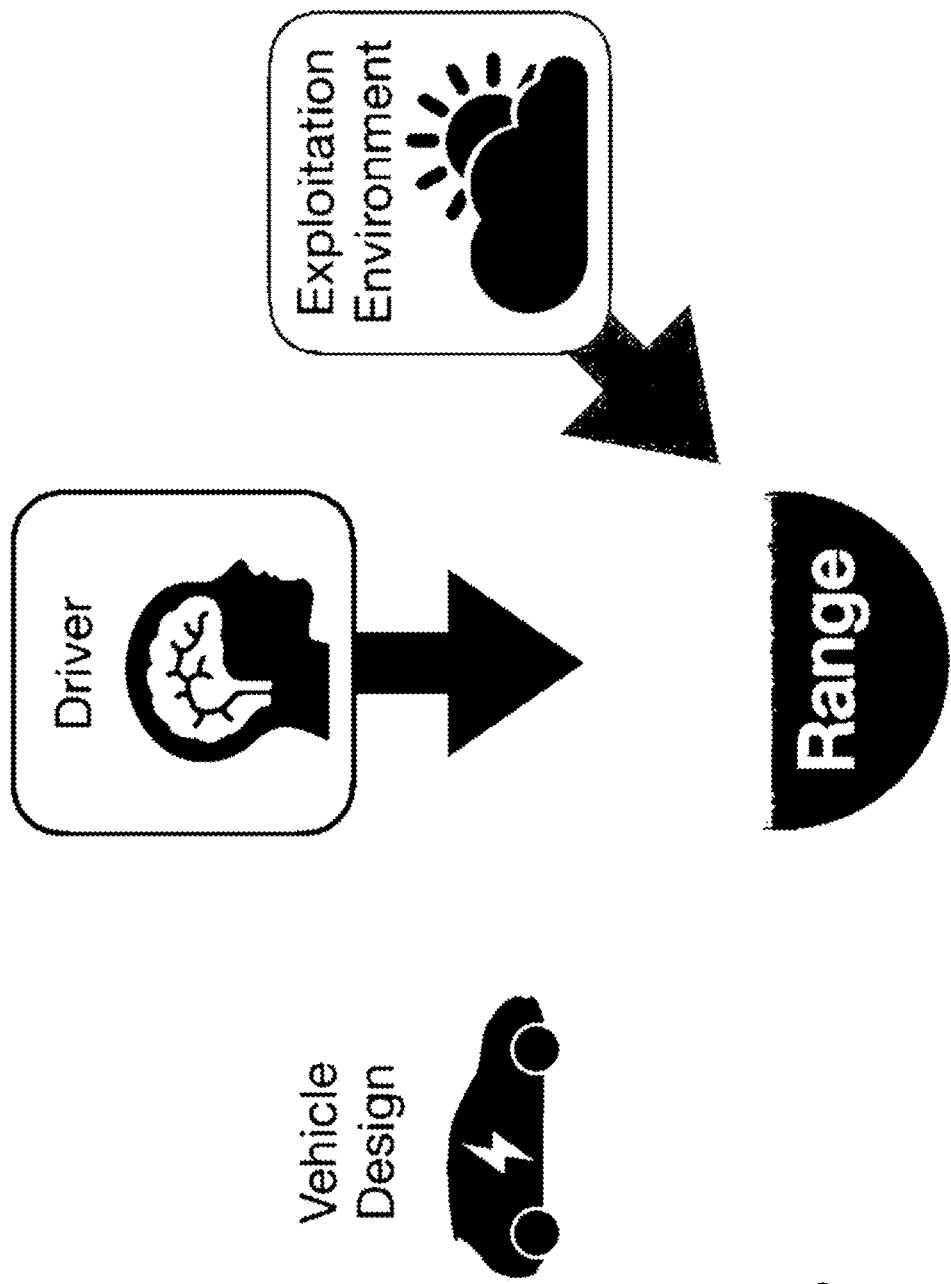

FIG. 2B illustrates example influence factors for electrical vehicle (EV) ranges. As shown, the EV ranges can be affected by vehicle design, the driver and the (exploitation) environment in which an electric operates. By identifying specific influences that cause accelerated battery aging or deterioration, a system or a user can learn to control those influences within certain operational or usage limits.

SoH estimation/prediction techniques as described herein can be implemented or performed with electric vehicles in wide variety of vehicle designs as driven by a large population of drivers in various exploitation or physical environments or external driving conditions. These techniques can be used to provide or generate relatively accurate prediction/estimation of battery (cell, module and/or pack) SoH(s) that are beneficial for battery health management and/or vehicle or battery performance optimization, for avoidance of catastrophic dangerous hazards, for preventive maintenance, for extension of battery life, for generating or verifying certificates for reselling electric vehicles and/or battery units, for providing effective vehicle or battery operational modeling customized to specific geographic regions and/or specific drivers, etc.

It should be noted that, in various embodiments, SoH prediction/estimation may include, but are not necessarily limited to only, one or more of: state of charge (SoC), internal resistance, maximum achievable current, maximum achievable voltage, etc. Additionally, optionally or alternatively, the SoH prediction or estimation can include, or can be used to further derive, other states related to the SoH prediction/estimation including but not limited to rates of available power, available energy, changes in SoH prediction/estimation over time and/or between or among battery cells or modules, the remaining driving range, etc.

For example, driving range is an important factor for customers or users of electric vehicles. In some operational scenarios, a SoH prediction/estimation system as described herein can be built or used to eliminate range anxiety.

As depicted in FIG. 2B, the drive can influence on EV range and energy or battery efficiency of an electric vehicle. The driver's influence can be further separated or classified into driving style and preferences in using auxiliary equipment (e.g., air conditioning, open windows, use of lights, entertainment systems, etc.). The use of the heating, ventilation, and air conditioning (HVAC) system in the electric vehicle depends on the exploitation environment and/or weather conditions as well as the driver's personal comfort needs. In addition, the driver's driving style (e.g., the rate of acceleration, the speed of the vehicle, etc.) may depend at least in part on the road, traffic and a specific trip pattern.

The SoH prediction/estimation system as described herein can help reduce and even eliminate range anxiety by giving timely tips to the driver for efficient energy usage to preserve energy stored with the battery pack. Information for these tips and the current estimated supportable driving range can be visually and/or audibly displayed or rendered to the driver with the vehicle entertainment system's image display and/or audio speakers or even with the driver's smartphone devices. By way of example but not limitation, on-board interactive maps can be used to show accessible areas supported by the current SoH (including but not limited to SoC) of the battery pack in green. Additionally, optionally or alternatively, area reachable by taking measures related to adjusting driving behaviors and modifying uses or operations of auxiliary equipment can be shown in yellow on the same map. Additionally, optionally or alternatively, area not reachable even by taking measures related to adjusting driving behaviors and modifying uses or operations of auxiliary equipment can be shown in red on the same map.

In some operational scenarios, for a selected destination point, the interactive map can show an energy efficient route. When there is not enough energy in the battery pack to reach the selected destination point, the system can cause a warning to be provided to the driver and a new route to be built, identified and shown on the interactive map with a stop at the closest charging station.

For the purpose of illustration only, it has been described that cell, module and/or pack level history data such as those collected during charging cycles for physical quantities such as voltages, currents, temperatures, etc., can serve as input data to drive individual or overall SoH prediction or estimation model(s) to predict or estimate SoH for individual battery cells, individual battery modules and/or a battery pack incorporating these battery cells or modules. It should be noted that, in various embodiments, these and/or other types of physical quantities (e.g., pressure, etc.) collected or measured in charging or discharging cycles may be used as input data to drive SoH prediction or estimation model(s) in training or in actual deployment. Additionally, optionally or alternatively, different types and/or combinations of physical quantities may be used at different levels. For example, physical quantities available for history data at battery cell level may be different from physical quantities available for history data at battery module and/or pack levels.

In some operational scenarios, an SoH prediction or estimation model may be driven with training or non-training data that does not include measurements for each and every battery cell, for each and every battery module, for the battery pack. For example, raw sensor data from one or more sampled battery cells representing a proper subset of all battery cells in a battery module, one or more sampled battery modules representing a proper subset of all battery modules in a battery pack, etc., may be used as input data to train or drive an SoH prediction or estimation model as described herein.

In some operational scenarios, an SoH prediction or estimation model may be trained with training data that does not include ground truths for each and every battery cell, for each and every battery module, for the battery pack. For example, ground truths for one or more battery cells representing a proper subset of all battery cells in a battery module, one or more sampled battery modules representing a proper subset of all battery modules in a battery pack, etc., may be used as ground truths to train or minimize prediction errors in an SoH prediction or estimation model as described herein.

4.0. Example Process Flows

FIG. 4 illustrates an example process flow 400 according to an embodiment. In some embodiments, one or more computing devices or components may perform this process flow. In block 402, a system (e.g., an in-vehicle or out-of-vehicle BMS system, a hybrid BMS system, a hierarchical BMS system, etc.) as described herein collects raw sensor data from a battery module. The battery module includes a plurality of battery cells.

In block 404, the system extracts input battery features from the raw sensor data collected from the battery module.

In block 406, the system uses the input battery features to update node states of a graph neural network (GNN). The GNN include a plurality of GNN nodes each of which representing a respective battery cell in the plurality of battery cells.

In block 408, the system generates, based at least in part on individual output states of individual GNN nodes in the plurality of GNN nodes, estimation of one or more battery state of health (SoH) indicators. The individual output states of individual GNN nodes in the plurality of GNN nodes are determined based at least in part on the updated node states of the GNN.

In an embodiment, the one or more battery SoH indicators includes at least one of: one or more battery cell SoH indicators for each battery cell in the plurality of battery cells, one or more battery module SoH indicators for the battery module, etc.

In an embodiment, the one or more battery SoH indicators includes at least a estimated value of one of: battery capacity, state of charge, internal resistance, available power, available energy, maximum achievable voltage, maximum achievable current, etc.

In an embodiment, the raw sensor data includes (a) a plurality of first raw battery cell data time series for the plurality of battery cells in the battery module, (b) a second raw battery module data time series for the battery module, and so on.

In an embodiment, the input battery features are extracted with a neural network layer of one-dimensional convolutional neural networks and one or more dense neural network layers.

In an embodiment, the estimation of one or more battery state of health (SoH) indicators are predicted with one or more task specific neural network layers that receive the output states of the individual GNN nodes as input.

In an embodiment, a plurality of battery modules in a battery pack includes the battery module; the battery pack is modeled by (a) a plurality of first GNNs with first nodes represented by battery cells and (b) a second GNN with a plurality of second GNN nodes represented by the plurality of battery modules, respectively; the plurality of first GNNs include the GNN; the system further performs: collecting, from the battery pack, a plurality of sets of cell-level raw sensor data from individual battery cells in the plurality of battery modules, a plurality of sets of module-level raw sensor data from individual battery modules in the battery pack, and a set of pack-level raw sensor data from the battery pack; extracting a plurality of sets of cell-level input battery features from the plurality of sets of cell-level raw sensor data, a plurality of sets of module-level input battery features from the plurality of sets of module-level raw sensor data, and a set of pack-level input battery features from the set of pack-level raw sensor data; using the plurality of sets of cell-level input battery features to update a plurality of sets of first node states in the plurality of first GNNs, and the plurality of sets of module-level input battery features to update a set of second node states in the second GNN; generating, based at least in part on individual first output states of individual first GNN nodes in the plurality of sets of first GNN nodes and individual second output states of individual second GNN nodes in the set of second GNN nodes, estimation of a plurality of battery SoH indicators for individual battery cells in the battery pack, individual battery modules in the battery pack, and the battery pack itself, wherein the individual first output states of individual first GNN nodes in the plurality of sets of first GNN nodes are determined based at least in part on the plurality of sets of first node states as updated; wherein individual second output states of individual second GNN nodes in the set of second GNN nodes are determined base at least in part on the set of second node states as updated.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
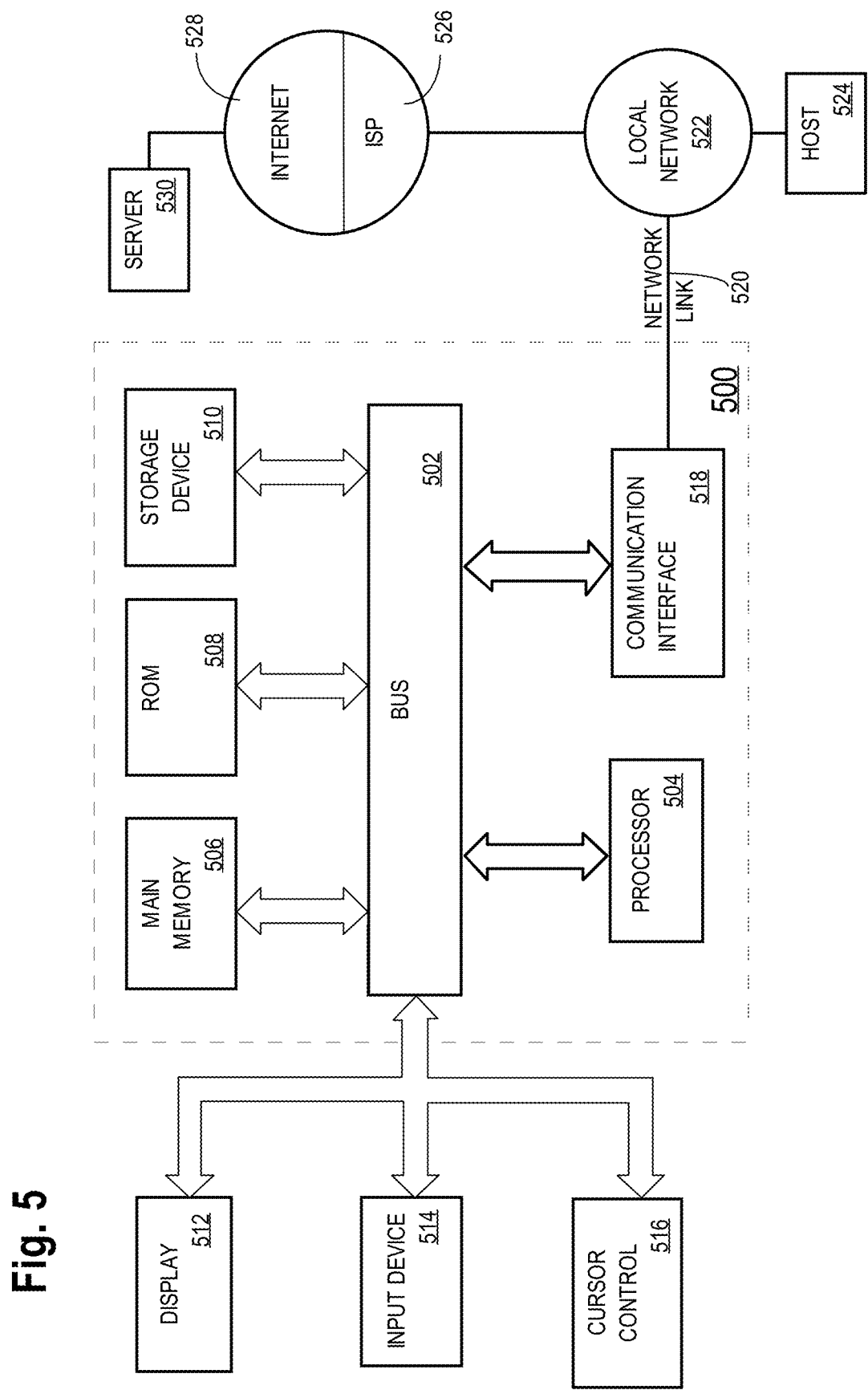
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 505, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
collecting raw sensor data from a battery module, wherein the battery module includes a plurality of battery cells;
extracting input battery features from the raw sensor data collected from the battery module;
using the input battery features to update node states of a graph neural network (GNN), wherein the GNN includes a plurality of GNN nodes each of which representing a respective battery cell in the plurality of battery cells;
generating, based at least in part on individual output states of individual GNN nodes in the plurality of GNN nodes, estimation of one or more battery state of health (SoH) indicators, wherein the individual output states of individual GNN nodes in the plurality of GNN nodes are determined based at least in part on the updated node states of the GNN; and
performing, based at least in part on the estimation of the one or more battery SoH indicators, one of replacing the battery module, balancing the plurality of battery cells or the battery module, and distributing loads to the battery module.

2. The method of claim 1, wherein the one or more battery SoH indicators includes at least one of: one or more battery cell SoH indicators for each battery cell in the plurality of battery cells, or one or more battery module SoH indicators for the battery module.

3. The method of claim 1, wherein the one or more battery SoH indicators includes at least a estimated value of one of: battery capacity, state of charge, internal resistance, available power, available energy, maximum achievable voltage, or maximum achievable current.

4. The method of claim 1, wherein the raw sensor data includes (a) a plurality of first raw battery cell data time series for the plurality of battery cells in the battery module and (b) a second raw battery module data time series for the battery module.

5. The method of claim 1, wherein the input battery features are extracted with a neural network layer of one-dimensional convolutional neural networks and one or more dense neural network layers.

6. The method of claim 1, wherein the estimation of one or more battery state of health (SoH) indicators are predicted with one or more task specific neural network layers that receive the output states of the individual GNN nodes as input.

7. The method of claim 1, wherein a plurality of battery modules in a battery pack includes the battery module; wherein the battery pack is modeled by (a) a plurality of first GNNs with first nodes represented by battery cells and (b) a second GNN with a plurality of second GNN nodes represented by the plurality of battery modules, respectively; wherein the plurality of first GNNs include the GNN; the method further comprising:
collecting, from the battery pack,
a plurality of sets of cell-level raw sensor data from individual battery cells in the plurality of battery modules,
a plurality of sets of module-level raw sensor data from individual battery modules in the battery pack, and
a set of pack-level raw sensor data from the battery pack;
extracting
a plurality of sets of cell-level input battery features from the plurality of sets of cell-level raw sensor data, a plurality of sets of module-level input battery features from the plurality of sets of module-level raw sensor data, and
a set of pack-level input battery features from the set of pack-level raw sensor data;
using
the plurality of sets of cell-level input battery features to update a plurality of sets of first node states in the plurality of first GNNs, and
the plurality of sets of module-level input battery features to update a set of second node states in the second GNN; and
generating,
based at least in part on individual first output states of individual first GNN nodes in the plurality of sets of first GNN nodes and individual second output states of individual second GNN nodes in the set of second GNN nodes, estimation of a plurality of battery SoH indicators for individual battery cells in the battery pack, individual battery modules in the battery pack, and the battery pack itself, wherein the individual first output states of individual first GNN nodes in the plurality of sets of first GNN nodes are determined based at least in part on the plurality of sets of first node states as updated; wherein individual second output states of individual second GNN nodes in the set of second GNN nodes are determined base at least in part on the set of second node states as updated.

8. One or more non-transitory computer readable media storing a program of instructions that is executable by one or more computing processors to perform:
collecting raw sensor data from a battery module, wherein the battery module includes a plurality of battery cells;
extracting input battery features from the raw sensor data collected from the battery module;
using the input battery features to update node states of a graph neural network (GNN), wherein the GNN includes a plurality of GNN nodes each of which representing a respective battery cell in the plurality of battery cells; and
generating, based at least in part on individual output states of individual GNN nodes in the plurality of GNN nodes, estimation of one or more battery state of health (SoH) indicators, wherein the individual output states of individual GNN nodes in the plurality of GNN nodes are determined based at least in part on the updated node states of the GNN,
wherein, based at least in part on the estimation of the one or more battery SoH indicators, one of the following actions is performed: replacing the battery module, balancing the plurality of battery cells or the battery module, and distributing loads to the battery module.

9. The media of claim 8, wherein the one or more battery SoH indicators includes at least one of: one or more battery cell SoH indicators for each battery cell in the plurality of battery cells, or one or more battery module SoH indicators for the battery module.

10. The media of claim 8, wherein the one or more battery SoH indicators includes at least a estimated value of one of: battery capacity, state of charge, internal resistance, available power, available energy, maximum achievable voltage, or maximum achievable current.

11. The media of claim 8, wherein the raw sensor data includes (a) a plurality of first raw battery cell data time series for the plurality of battery cells in the battery module and (b) a second raw battery module data time series for the battery module.

12. The media of claim 8, wherein the input battery features are extracted with a neural network layer of one-dimensional convolutional neural networks and one or more dense neural network layers.

13. The media of claim 8, wherein the estimation of one or more battery state of health (SoH) indicators are predicted with one or more task specific neural network layers that receive the output states of the individual GNN nodes as input.

14. The media of claim 8, wherein a plurality of battery modules in a battery pack includes the battery module; wherein the battery pack is modeled by (a) a plurality of first GNNs with first nodes represented by battery cells and (b) a second GNN with a plurality of second GNN nodes represented by the plurality of battery modules, respectively; wherein the plurality of first GNNs include the GNN; the program of instructions is executable by the one or more computing processors to further perform:
collecting, from the battery pack,
a plurality of sets of cell-level raw sensor data from individual battery cells in the plurality of battery modules,
a plurality of sets of module-level raw sensor data from individual battery modules in the battery pack, and
a set of pack-level raw sensor data from the battery pack;
extracting
a plurality of sets of cell-level input battery features from the plurality of sets of cell-level raw sensor data,
a plurality of sets of module-level input battery features from the plurality of sets of module-level raw sensor data, and
a set of pack-level input battery features from the set of pack-level raw sensor data;
using
the plurality of sets of cell-level input battery features to update a plurality of sets of first node states in the plurality of first GNNs, and
the plurality of sets of module-level input battery features to update a set of second node states in the second GNN; and
generating,
based at least in part on individual first output states of individual first GNN nodes in the plurality of sets of first GNN nodes and individual second output states of individual second GNN nodes in the set of second GNN nodes, estimation of a plurality of battery SoH indicators for individual battery cells in the battery pack, individual battery modules in the battery pack, and the battery pack itself, wherein the individual first output states of individual first GNN nodes in the plurality of sets of first GNN nodes are determined based at least in part on the plurality of sets of first node states as updated; wherein individual second output states of individual second GNN nodes in the set of second GNN nodes are determined base at least in part on the set of second node states as updated.

15. A system comprising: one or more computing processors; one or more non-transitory computer readable media storing a program of instructions that is executable by the one or more computing processors to perform:

collecting raw sensor data from a battery module, wherein the battery module includes a plurality of battery cells;

extracting input battery features from the raw sensor data collected from the battery module;

using the input battery features to update node states of a graph neural network (GNN), wherein the GNN includes a plurality of GNN nodes each of which representing a respective battery cell in the plurality of battery cells; and generating, based at least in part on individual output states of individual GNN nodes in the plurality of GNN nodes, estimation of one or more battery state of health (SoH) indicators, wherein the individual output states of individual GNN nodes in the plurality of GNN nodes are determined based at least in part on the updated node states of the GNN, wherein, based at least in part on the estimation of the one or more battery SoH indicators, one of the following actions is performed: replacing the battery module, balancing the plurality of battery cells or the battery module, and distributing loads to the battery module.

16. The system of claim 15, wherein the one or more battery SoH indicators includes at least one of: one or more battery cell SoH indicators for each battery cell in the plurality of battery cells, or one or more battery module SoH indicators for the battery module.

17. The system of claim 15, wherein the one or more battery SoH indicators includes at least a estimated value of one of: battery capacity, state of charge, internal resistance, available power, available energy, maximum achievable voltage, or maximum achievable current.

18. The system of claim 15, wherein the raw sensor data includes (a) a plurality of first raw battery cell data time series for the plurality of battery cells in the battery module and (b) a second raw battery module data time series for the battery module.

19. The system of claim 15, wherein the input battery features are extracted with a neural network layer of one-dimensional convolutional neural networks and one or more dense neural network layers.

20. The system of claim 15, wherein the estimation of one or more battery state of health (SoH) indicators are predicted with one or more task specific neural network layers that receive the output states of the individual GNN nodes as input.

21. The system of claim 15, wherein a plurality of battery modules in a battery pack includes the battery module; wherein the battery pack is modeled by (a) a plurality of first GNNs with first nodes represented by battery cells and (b) a second GNN with a plurality of second GNN nodes represented by the plurality of battery modules, respectively; wherein the plurality of first GNNs include the GNN; the program of instructions is executable by the one or more computing processors to further perform:

collecting, from the battery pack,
a plurality of sets of cell-level raw sensor data from individual battery cells in the plurality of battery modules,
a plurality of sets of module-level raw sensor data from individual battery modules in the battery pack, and
a set of pack-level raw sensor data from the battery pack;

extracting
a plurality of sets of cell-level input battery features from the plurality of sets of cell-level raw sensor data,
a plurality of sets of module-level input battery features from the plurality of sets of module-level raw sensor data, and
a set of pack-level input battery features from the set of pack-level raw sensor data;

using
the plurality of sets of cell-level input battery features to update a plurality of sets of first node states in the plurality of first GNNs, and
the plurality of sets of module-level input battery features to update a set of second node states in the second GNN; and generating,
based at least in part on individual first output states of individual first GNN nodes in the plurality of sets of first GNN nodes and individual second output states of individual second GNN nodes in the set of second GNN nodes, estimation of a plurality of battery SoH indicators for individual battery cells in the battery pack, individual battery modules in the battery pack, and the battery pack itself, wherein the individual first output states of individual first GNN nodes in the plurality of sets of first GNN nodes are determined based at least in part on the plurality of sets of first node states as updated; wherein individual second output states of individual second GNN nodes in the set of second GNN nodes are determined base at least in part on the set of second node states as updated.

* * * * *